(12) United States Patent
Komatsu et al.

(10) Patent No.: US 10,427,220 B2
(45) Date of Patent: Oct. 1, 2019

(54) NANOPARTICLE PRODUCTION METHOD, PRODUCTION DEVICE AND AUTOMATIC PRODUCTION DEVICE

(71) Applicants: APPLIED NANOPARTICLE LABORATORY CORPORATION, Suita-shi, Osaka (JP); NIHON SUPERIOR CO., LTD., Suita-shi, Osaka (JP)

(72) Inventors: Teruo Komatsu, Suita (JP); Tetsuro Nishimura, Suita (JP)

(73) Assignees: APPLIED NANOPARTICLE LABORATORY CORPORATION, Suita-shi (JP); NIHON SUPERIOR CO., LTD., Suita-shi (JP)

( * ) Notice: Subject to any disclaimer, the term of this patent is extended or adjusted under 35 U.S.C. 154(b) by 503 days.

(21) Appl. No.: 14/904,320

(22) PCT Filed: Jul. 11, 2013

(86) PCT No.: PCT/JP2013/068978
§ 371 (c)(1),
(2) Date: Jan. 11, 2016

(87) PCT Pub. No.: WO2015/004770
PCT Pub. Date: Jan. 15, 2015

(65) Prior Publication Data
US 2016/0136732 A1    May 19, 2016

(51) Int. Cl.
B22F 9/24        (2006.01)
B22F 1/00        (2006.01)
(Continued)

(52) U.S. Cl.
CPC .............. *B22F 9/24* (2013.01); *B22F 1/0018* (2013.01); *B22F 1/0044* (2013.01); *B22F 9/02* (2013.01);
(Continued)

(58) Field of Classification Search
CPC .......... B22F 9/24; B22F 3/003; B22F 1/0018; B22F 1/0044; B22F 2998/10; B22F 9/02; B82Y 30/00; B82Y 40/00
(Continued)

(56) References Cited

U.S. PATENT DOCUMENTS

| 7,935,169 B2 * | 5/2011 | Lee ........................ B22F 9/24 266/170 |
| 2003/0115986 A1 * | 6/2003 | Pozarnsky ............ B01D 47/00 75/331 |
| 2005/0118095 A1 * | 6/2005 | Kim ...................... B82Y 30/00 423/608 |

FOREIGN PATENT DOCUMENTS

| JP | 04333504 A | * 11/1992 |
| JP | H04-333504 | 11/1992 |

(Continued)

*Primary Examiner* — Scott R Kastler
*Assistant Examiner* — Michael Aboagye
(74) *Attorney, Agent, or Firm* — Westerman, Hattori, Daniels & Adrian, LLP

(57) ABSTRACT

A nanoparticle production apparatus and automatic production apparatus that allow continuous mass production of nanoparticles with a uniform particle diameter and allow freely adjusting the generation time are provided. This nanoparticle production apparatus is characterized by being configured from: reaction tubes (30, 40) which are filled with the same solvent (11) as that in a ingredient liquid (18), which is used in nanoparticle production and comprises an ingredient material (12) mixed into the solvent (11); a heating apparatus (22) which controls the temperature of the solvent (11) in the reaction tubes (30, 40) to the synthesis (Continued)

temperature of the nanoparticles (26); inflow ends (30*e*, 40*e*) of the reaction tubes into which the ingredient liquid (18) is supplied; rotors (35, 45) which form spiral flows (e, j) along the inner surface of the outer walls (30*h*, 40*h*) of the reaction tubes while mixing the ingredient liquid (18) supplied and the solvent (11) present in the reaction tubes (30, 40); and outflow ends (30*f*, 40*f*) of the reaction tubes (30, 40) for forming, in the spiral flows (e, j), nanoparticles (26) from the ingredient material (12) and discharging a generation liquid (65) containing the nanoparticles (26).

7 Claims, 22 Drawing Sheets

(51) Int. Cl.
    *B22F 9/02*     (2006.01)
    *B82Y 30/00*     (2011.01)
    *B82Y 40/00*     (2011.01)
(52) U.S. Cl.
    CPC ... *B22F 2009/245* (2013.01); *B22F 2301/255* (2013.01); *B22F 2304/05* (2013.01); *B22F 2998/10* (2013.01); *B22F 2999/00* (2013.01); *B82Y 30/00* (2013.01); *B82Y 40/00* (2013.01)
(58) Field of Classification Search
    USPC .............. 266/200; 428/402; 228/56.3, 248.1; 420/501
    See application file for complete search history.

(56) References Cited

FOREIGN PATENT DOCUMENTS

| | | |
|---|---|---|
| JP | H10-183207 | 7/1998 |
| JP | P2005-264199 A | 9/2005 |
| JP | P2006-503790 A | 2/2006 |
| JP | P2008-285749 A | 11/2008 |
| JP | P2008-302281 A | 12/2008 |
| JP | P2009-039702 A | 2/2009 |
| JP | P2010-184230 A | 8/2010 |
| WO | WO2009/090846 | 7/2009 |

\* cited by examiner

FIG.4
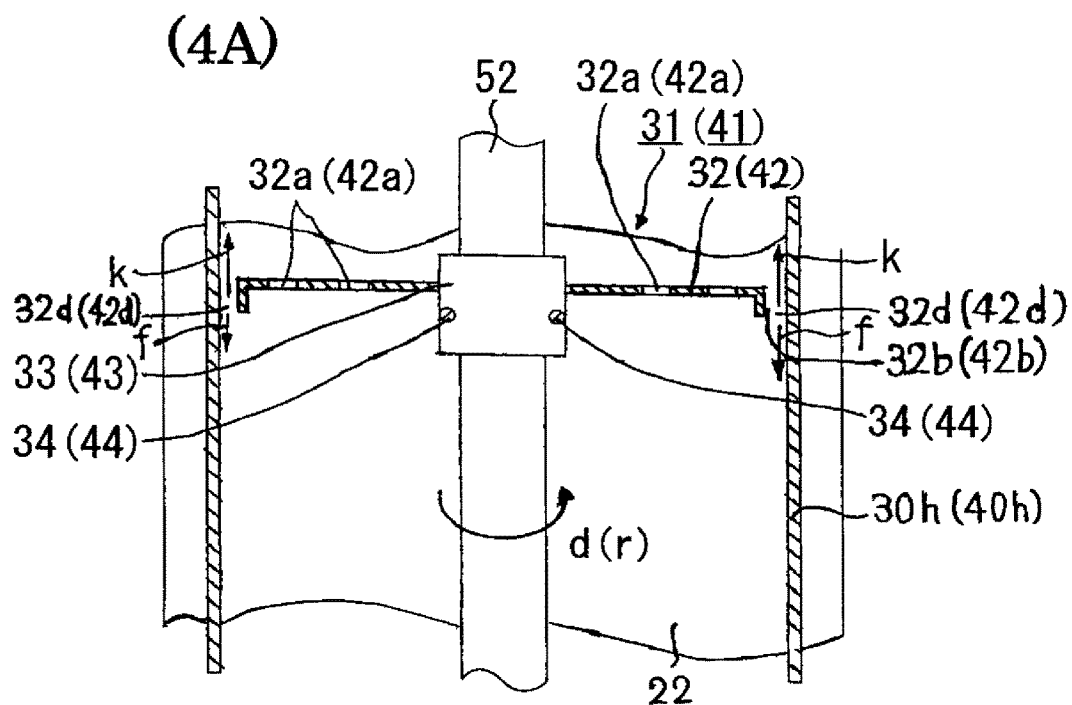
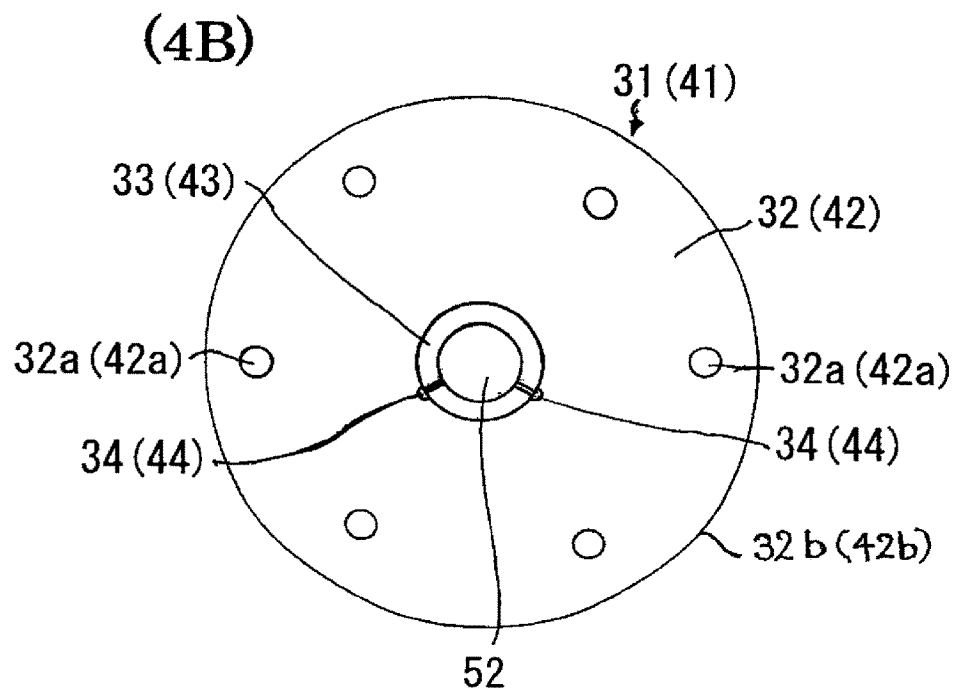

FIG.20 --Prior Art--

FIG.21
(21A) --Prior Art--
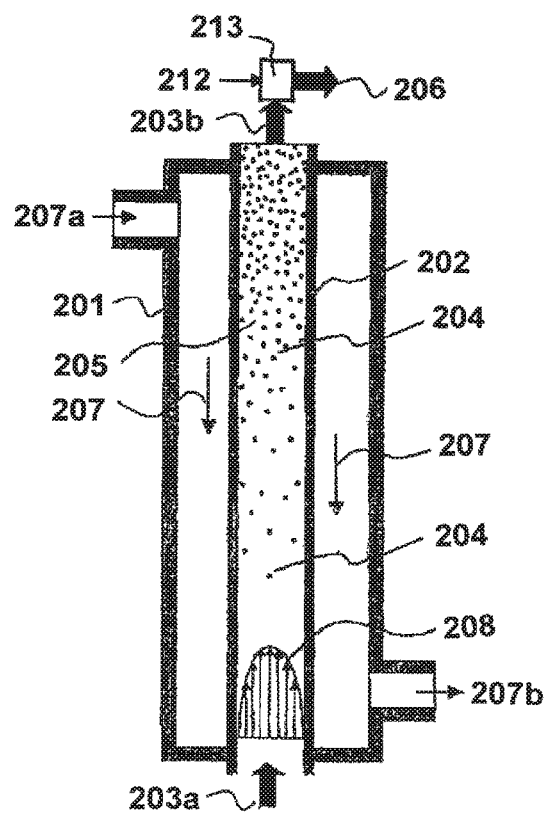
(21B) --Prior Art--
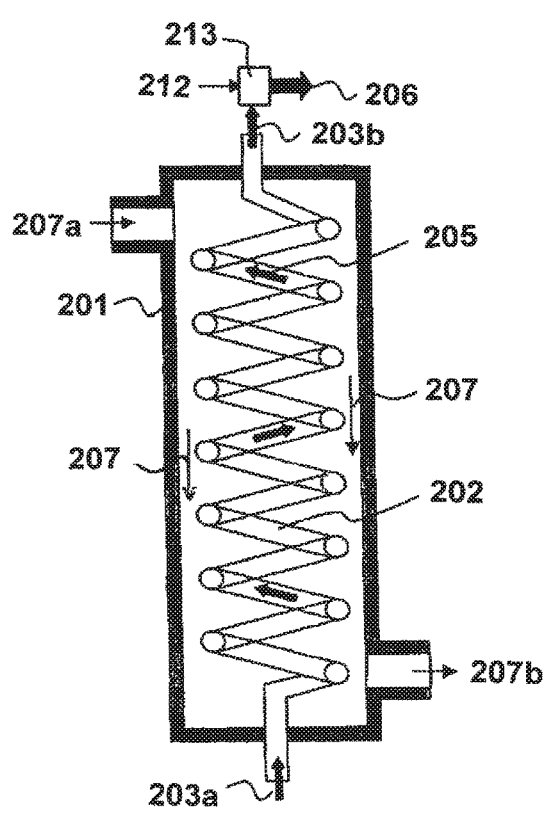

FIG.22 --Prior Art--
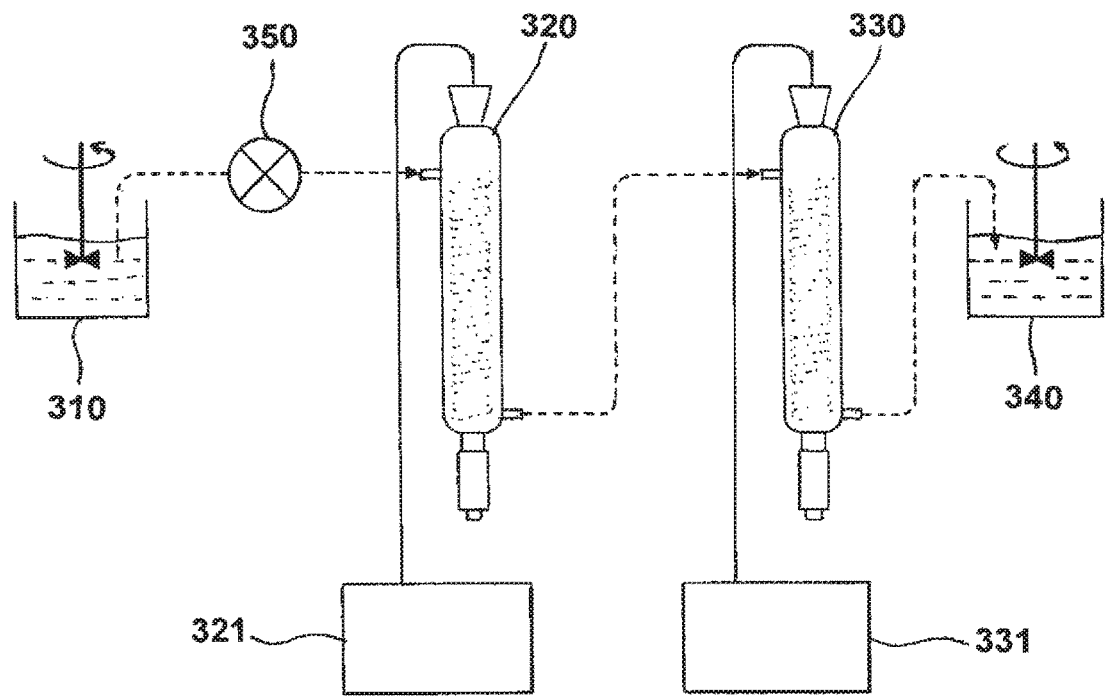

NANOPARTICLE PRODUCTION METHOD, PRODUCTION DEVICE AND AUTOMATIC PRODUCTION DEVICE

CROSS REFERENCE TO RELATED APPLICATIONS

This application is a national stage of international application PCT/JP2013/068978, filed on Jul. 11, 2013 which is incorporated herein by reference.

FIELD OF THE INVENTION

The present invention relates to a method producing nanoparticles from a solvent an ingredient material, and more specifically relates to a production method of nanoparticles with an uniform thin diameter, a production device and an automatic production device.

BACKGROUND ART

In late years, as a metal nanoparticle for junction use or metal pattern formation, there has been done the development of the composite nanometal particle that the organic coating layer comprising various kinds of organic substance surrounds the metal core of less than or equal to 100 nm. By way of example only, in example 1 of Japanese Patent Laid-Open No. 10-183207 (Patent Document 1), it is described the ultrafine particle having the organic coating layer of stearic acid surrounding the core of metal silver. In addition, in WO2009/090846 bulletin (Patent Document 2), the present inventors disclose the composite nanosilver particle in which the organic coating layer such as alcohol molecule or alcohol derivative is formed around the silver core. These nanoparticles are kneaded and mixed with a resin and a solvent to a paste, and this paste is employed for semiconductor junction and used to printing ink. Extent of particle size of a nanoparticle and its uniformity of particle size participate in a quality of paste greatly. Therefore, the development of an apparatus mass-producing the minute nanoparticles with good uniformity is extremely important.

As an approach to produce nanoparticles, there are the solid phase method, the liquid phase method and the gas phase method. Since nanoparticles are produced by melting a solid in the solid phase method, a large quantity of nanoparticles can be obtained because of a large amount of material, but there are many cases that the particle size becomes large, the cohesion is cruel and the uniformity of particle size is difficult. Since nanoparticles are produced by means of gaseous reaction in the gas phase method, an amount of substance becomes small, and it is not suitable for a large amount production of nanoparticles. Thus the liquid phase method has been developed. In the liquid phase method, an ingredient material is dispersed or dissolved in a solvent to form a solution, and nanoparticles are manufactured through solution reaction, so that a large amount production of nanoparticles become possible because of a large amount of substance. Besides, if the concentration is adjusted, it is advantageous in that the uniformity of particle size of nanoparticles is easy to be achieved.

As the liquid phase method to produce nanoparticles, Japanese Patent Laid-Open No. 2005-264199 bulletin (Patent Document 3), JP-T 2006-503790 bulletin (Patent Document 4) and Japanese Patent Laid-Open No. 2008-285749 bulletin (Patent Document 5) are known.

The nanoparticle production apparatus of Patent Document 3 is shown in FIG. 20 of the present patent application. In FIG. 20, 101 is the micro-reactor, 102 the ultrasonic generator, 103 the water bath, 104 the reaction unit, 105 the base plate, 106 the middle lamination thin plate, 107 the top plate, 108 the inflow line, 109 the microchannel, 110 the outflow outlet, 126 the engaging bolt, 126 the supersonic wave, 126a the part which is strengthened by supersonic wave interference, and 126b the part which is weakened by supersonic wave interference.

The function of this micro reactor 101 makes a metal salt aqueous solution flow into the inflow line 108, irradiates the supersonic wave into the microchannel 109 (109a, 109b) of size of several μm to several hundreds μm in diameter and generates the metal ultrafine particles (nanoparticles) in the aqueous solution from the metal salt using the supersonic wave energy.

The nanoparticle production apparatus of patent document 4 is shown in FIG. 21 of the present patent application. FIG. 21A) shows the nanoparticle production apparatus of straight tube type, where 201 is the reactor, 202 the reaction tube, 203a the zirconium salt solution (ingredient aqueous solution), 203b the suspension liquid, 204 the precipitation particle, 205 the reaction mixture (precipitation solution), 206 the hydrous zirconia sol, 207 the heating medium, 207a the inlet, 207b the outlet, 208 the velocity gradient formed in the interior of the reaction tube, 212 the pH moderator, and 213 the mixer.

As the function of this reactor 201, the heating medium 207 flows from the inlet 207a to the outlet 207b, and the precipitation particle 204 (hydrous zirconia nanoparticle) is generated when heating the ingredient aqueous solution 203a in the reaction tube 202, so that the hydrous zirconia sol 206 is emitted. However, as the generation condition of nanoparticles, it is described in the paragraph [0052] that the cross section diameter of the reaction tube is preferred at 0.01 cm-5 cm, it is described in the paragraph [0041] that the zirconium salt solution is preferred at the state without vortex, namely at the laminar flow state, and it is described in the paragraph [0049] that the flow velocity u of the zirconium salt solution is preferred at that the mean flow-time in the reaction tube is determined to be 1-60 seconds. However, there are weak points that the mass production of nanoparticles is difficult because the collision probability becomes small in the laminar flow state and the control of the production apparatus is difficult because nanoparticles are manufactured in an extremely short time of 1-60 seconds.

Furthermore, although FIG. (21B) shows the nanoparticle production apparatus of spiral tube type, the reaction tube 202 is only changed to the spiral tube type to lengthen the reaction time, and other conditions are similar with FIG. (21A). That is to say, it is wished that the solution flows with the laminar flow condition in the reaction tube, and it is unchanged that the residence time in the total length of the spiral tube is a short time of 1-60 seconds. Therefore, the mass production of nanoparticles is unsuitable and the difficulty of generation control exists as a weak point.

The nanoparticle production apparatus of patent document 5 is shown in FIG. 22 of the present patent application. In FIG. 22, 310 is the precursor feed portion, 320 the first heating portion, 321 the first circulatory device, 330 the second heating portion, 331 the second circulatory device, 340 the cooling portion and 350 the transfer apparatus. In addition, in the first heating portion 320 and the second heating portion 330, the reactor channel of capacitor type with the spiral form structure of 1.50 mm in diameter is built-in, and the coil tube of the reactor channel (spiral tube) becomes to be heated by heat value of the heating portion.

According to this nanoparticle production apparatus, firstly the precursor solution of metal nanoparticle is supplied from the precursor feed portion 310 to the first heating portion 320 through the transfer apparatus 350, and the precursor solution is preheated by the temperature which does not cause the nanoparticle generation in the first heating portion 320 kept warm by the first circulatory device 321. Next, the preheated precursor solution is transferred to the second heating portion 330, and the nanoparticles are generated in the reaction channel inside of the second heating portion kept warm at the temperature which causes the nanoparticle generation by the second circulatory device 331. And the generated nanoparticle solution is transferred to the cooling portion 340 and is cooled off, so that the nanoparticle generation is stopped.

PRIOR ART DOCUMENT

Patent Document

[Patent Document 1] Japanese Patent Laid-Open No. 10-183207
[Patent Document 2] International Publication WO2009/090846 bulletin
[Patent Document 3] Japanese Patent Laid-Open No. 2005-264199 bulletin
[Patent Document 4] JP-T 2006-503790 bulletin
[Patent Document 5] Japanese Patent Laid-Open No. 2008-285749 bulletin

DISCLOSURE OF THE INVENTION

Problems to be Solved by the Invention

In the nanoparticle production apparatus of patent document 3, there is the defect that the size of microchannel 9 is extremely narrow to be several μm to several handred μm in diameter so that it is easy to cause blocking by nanoparticles generated. Even if the metal salt aqueous solution can be supplied continually, when the blocking occurs once, it occurs the weak point that the flow of the metal salt aqueous solution becomes impossible and the production of nanoparticles stops.

In the nanoparticle production apparatus of patent document 4, since the reaction liquid is in the laminar flow condition, the mass production of nanoparticles is difficult because the collision probability between particles generating nanoparticles becomes small, and since it is necessary to manufacture nanoparticles in a extremely short time of 1-60 seconds in the reaction tube, it is difficult to perform the flow control and the temperature control in such a short time, so that there is a weak point that the control performance of whole apparatus descends.

In the nanoparticle production apparatus of patent document 5, the reaction channel comprising straight tube or coil tube is disposed in the interior of the second heating portion 330, and it is adopted the system that nanoparticles are generated by streaming the precursor solution through this reaction channel. Therefore, it is closely resembled with patent document 2 structurally, so that there are the similar defects as patent document 2, that is to say, it is unsuitable for the mass production of nanoparticles because the collision probability falls when the flow in the channel is a laminar flow, and there is difficult for the mass production of nanoparticles because it streams the channel in a short time and the reaction time is short.

Therefore, it is one object of the present invention to provide a nanoparticle production method and a nanoparticle production apparatus, by which it is possible not only to manufacture the uniform nanoparticles with minute diameter and simultaneously to mass-produce the nanoparticles for continuity, but also to shorten or prolong the generation time of nanoparticles, and it is the other object of the present invention to provide an automatic production apparatus which can treat consistently the manufacture of ingredient liquid, the generation of nanoparticles, the enrichment of generation liquid and the drying of enriched liquid by computer control.

Means to Solve the Problems

The present invention has been completed to solve the above problem, and the first form of the present invention is an nanoparticle production method comprising the steps of preparing an ingredient liquid for production of an nanoparticle that an ingredient material is mixed with a solvent, disposing a reaction tube in which said ingredient liquid flows, filling said ingredient liquid and/or the same solvent as said ingredient liquid inside of said reaction tube, controlling a temperature of said solvent of said reaction tube at a synthesis temperature of said nanoparticle, supplying said ingredient liquid to an inflow end of said reaction tube, forming a spiral flow streaming from said inflow end to an outflow end that goes around along a circumferential direction of an inner surface of an outer wall in said reaction tube while said ingredient liquid supplied is mixed with the solvent of said reaction tube or while said ingredient liquid is stirred, forming said nanoparticle from said ingredient material in said spiral flow, and emitting a generation liquid including said nanoparticle from said outflow end of said reaction tube.

The second form of the present invention is the nanoparticle production method according to said first form, wherein said reaction tube is divided into one or more partitions along a streaming direction of said ingredient liquid, in an inlet side of said partition there is formed an annular opening portion which is opened in a circumferential direction along said inner surface of said outer wall, said spiral flow passes through said annular opening portion, so that an annular spiral flow streams through one or more partitions, and said nanoparticle is formed in said annular spiral flow.

The third form of the present invention is the nanoparticle production method according to said form 1 or 2, wherein said ingredient liquid is preheated in a range of temperature where said nanoparticle is not synthesized.

The fourth form of the present invention is the nanoparticle production method according to said form 1, 2 or 3, wherein said reaction tubes with one or more steps are configured in a series form and/or a parallel form, and said spiral flow is selected from a lift flow, a slope flow or a horizontal flow.

The fifth form of the present invention is the nanoparticle production method according to any one of said forms 1 to 4, wherein said solvent and said ingredient material react at said synthesis temperature, so that said nanoparticle is manufactured.

The sixth form of the present invention is the nanoparticle production method according to any one of said forms 1 to 4, wherein said ingredient material contains a direct ingredient material and a reducing agent, and said direct ingredient material is reduced by said reducing agent in said solvent so that said nanoparticle is manufactured.

The seventh form of the present invention is the nanoparticle production method according to any one of said forms 1 to 6, wherein there is added one or more processes selected from a manufacturing process of said ingredient liquid, a manufacturing process of an enrichment liquid in which a concentration of said nanoparticle is increased by enriching of said generation liquid after manufacturing said generation liquid and a drying process of said enrichment liquid by which dries said enrichment liquid up more.

The eighth form of the present invention is the nanoparticle production method according to said form 7, wherein the manufacturing process of said enrichment liquid includes the steps of spraying said generation liquid into a decompression container so that the solvent is vaporized from said generation liquid and recovering said enrichment liquid in which the concentration of said nanoparticle is increased.

The ninth form of the present invention is the nanoparticle production method according to said form 7 or 8, wherein the drying process of said enrichment liquid includes the step of doing vacuum drying of said enrichment liquid in a container so that at least the nanoparticle does not scatter.

The tenth form of the present invention is an nanoparticle production apparatus comprising a reaction tube filled with a solvent and/or an ingredient liquid for production of a nanoparticle that an ingredient material is mixed with said solvent, a temperature control unit controlling a temperature of said solvent and/or said ingredient liquid in said reaction tube at a synthesis temperature of said nanoparticle, an inflow end of said reaction tube supplying said ingredient liquid, a rotor forming a spiral flow along an inner surface of an outer wall in said reaction tube while said ingredient liquid supplied is mixed with said solvent of said reaction tube or while said ingredient liquid is stirred, and an outflow end of said reaction tube emitting a generation liquid including said nanoparticle while forming said nanoparticle from said ingredient material in said spiral flow.

The eleventh form of the present invention is the nanoparticle production apparatus according to said form 10, comprising an rotating shaft disposed at a central position of said reaction tube, one or more separators fixed to the rotating shaft with an interval mutually, a partition formed between adjacent separators or between said separator and a tube end of said reaction tube, said rotor fixed to said rotating shaft in said partition, and an annular opening portion formed between an outer circumferential edge of said separator and said inner surface of said outer wall of said reaction tube, where an annular spiral flow streams through said partition because said spiral flow passes through said annular opening portion, so that said nanoparticle is formed in said annular spiral flow.

The twelfth form of the present invention is the nanoparticle production apparatus according to said form 11, wherein in a top plate portion of said separator, one or more gas omission holes are opened.

The thirteenth form of the present invention is the nanoparticle production apparatus according to said form 10, 11 or 12, wherein there is disposed a preheating apparatus that preheats said ingredient liquid in a range of temperature at which said nanoparticle is not synthesized before said ingredient liquid is supplied to said reaction tube.

The fourteenth form of the present invention is the nanoparticle production apparatus according to any one of said forms 10 to 13, wherein said reaction tubes with one or more steps are configured in a series form and/or a parallel form, and said spiral flow in an inner portion of each reaction tube is selected from a fall flow, a slope flow or a lift flow.

The fifteenth form of the present invention is the nanoparticle production apparatus according to any one of said forms 10 to 14, wherein there is added one or more apparatus selected from a manufacturing apparatus of said ingredient liquid, a manufacturing apparatus of an enrichment liquid in which a concentration of said nanoparticle is increased by enriching of said generation liquid after manufacturing said generation liquid and a drying apparatus of said enrichment liquid by which dries said enrichment liquid up more.

The sixteenth form of the present invention is a nanoparticle automatic production apparatus comprising a nanoparticle production apparatus according to any one of said forms 10 to 15 and a computer control apparatus controlling said nanoparticle production apparatus by an electrical signal, so that said nanoparticle automatic production apparatus operates according to a program saved in said computer control apparatus and automatically controls said nanoparticle production apparatus.

Effects of the Invention

According to the first form of the present invention, since there is prepared the ingredient liquid for production of an nanoparticle that an ingredient material is mixed with a solvent, the solvent is a simple solvent that dissolves or disperses the ingredient material, and the following two cases are included that one is the case that the nanoparticles are synthesized from the ingredient materials in the solvent, and the other is the case that the solvent becomes a kind of liquid ingredient material and the nanoparticles are synthesized from a reaction between the solvent and the ingredient material. As an example of the former, when the solvent is water and the ingredient materials are nitric acid metal salt, organic matter and reducing agent, the nitric acid metal salt is reduced by the reducing agent so that an organic coated metal nanoparticle is synthesized. In addition, as an example of the latter, as shown in the patent document 2, when the solvent is alcohol and the ingredient material is silver carbonate, the alcohol acts as reducing agent and organic matter as well solvent, a silver nanoparticle generated from silver carbonate reduced by the alcohol is coated with the organic matter originated from the alcohol, so that a metal nanoparticle is generated. As thus, the present invention gives the liquid phase manufacturing process of a wide range of nanoparticle.

In addition, since disposing a reaction tube in which said ingredient liquid flows, filling said ingredient liquid and/or the same solvent as said ingredient liquid inside of said reaction tube, controlling a temperature of said solvent of said reaction tube at a synthesis temperature of said nanoparticle, supplying said ingredient liquid to an inflow end of said reaction tube, and mixing the supplied ingredient liquid with the solvent in the reaction tube, the solvent in the reaction tube is the same solvent as the solvent of the ingredient liquid, so that there is no problem as if the ingredient liquid is mixed with the solvent. In addition, when said ingredient liquid is filled in the interior of the reaction tube, the ingredient liquid can be stirred. Besides, because the solvent of the reaction tube and/or the ingredient liquid is done the temperature control (heating/warming/constant temperature/cooling are included) at the synthesis temperature, the ingredient liquid supplied changes in the state of reaction promptly and the synthesis of nanoparticles starts in the reaction tube. The higher the synthesis temperature is, the faster the synthesis rate of the nanoparticle is, and when the temperature of ingredient liquid is set at high temperature of the extent that synthesis does not start, the synthesis can be started as of the mixing promptly.

Furthermore, since the mixed liquid or the ingredient liquid is formed to the spiral flow streaming from said inflow end to the outflow end that goes around along a circumferential direction of the inner surface of the outer wall in said reaction tube, the ingredient liquid comes close to the inner surface of the outer wall in said reaction tube by the centrifugal force, and the heavy ingredient material also comes close to the inner surface of the outer wall in said reaction tube by the centrifugal force, so that the nanoparticle is easy to be synthesized near the inner surface of the outer wall. When disposing the temperature control means (heating device, warm temperature device, incubator and cooler etc. are included) same as the tape heater on the outer surface of the outer wall in said reaction tube, it is possible to synthesize the nanoparticle efficiently near the inner surface of the outer wall while controlling the temperature with high synthesis rate. In addition, since constructing the spiral flow, it is possible to adjust the time arriving from the inflow end to the outflow end, namely, the reaction time, and especially although depending upon the length of the reaction tube, it is possible to arrange variably the reaction time from several seconds to dozens of minutes by adjusting the pitch of the spiral flow (the distance advancing between one rotation). In addition, since the spiral flow is turbulent or a little turbulent, the nanoreaction is activated by increasing of the collision probability between particles, and the generation reaction of various nanoparticles can be realized with high efficiency. The present invention is completely different from the straight type of the laminar flow and the spiral tube type of the laminar flow as explained in the conventional embodiments.

Besides, by the amount that supplied ingredient liquid, the generation liquid is pushed out of the outflow end, and if the feed of the ingredient liquid is performed for continuity, it is advantageous in that the generation liquid can be also refined for continuity and it is possible to realize the mass synthesis of nanoparticles.

According to the second form of the present invention, said reaction tube is divided into one or more partitions along a streaming direction of said ingredient liquid, in an inlet side of said partition there is formed an annular opening portion which is opened in a circumferential direction along said inner surface of said outer wall, said spiral flow passes through said annular opening portion, so that an annular spiral flow streams through one or more partitions, and hence although the ingredient liquid and the solvent of the reaction tube partially mix each other in the input side of first partition, most of ingredient liquid passes through said annular opening portion and flows into first partition, and while taking a step that it flows in from next annular opening portion to second partition, the ingredient liquid becoming the annular spiral flow goes to the outflow end from last partition. Therefore, synthesis of nanoparticle occurs in the continuous annular spiral flow with comparatively thin thickness, so that the diffusion of ingredient liquid can be suppressed and the nanoparticle can be generated approximately according to the concentration of ingredient liquid.

In addition, after it passes the first annular opening, the spiral flow stays temporarily in first partition while rotating, and after it passes next annular opening, the spiral flow stays temporarily in next partition while rotating, so that the residence time in the reaction tube gets longer than the spiral flow without the partition, and the generation reaction time of nanoparticles gets possible to be extended still more. Therefore, the reaction time becomes to be shortest in the case that there is no partition completely, and the increase of the installation number of partition gets possible to set the generation reaction time for the longer time.

Furthermore, the ingredient material of the heavy weight remains in the inside of said annular spiral flow with the spiral centrifugal force, and the annular spiral flow located near the inner surface of the outer wall is heated efficiently by the temperature control means installed on the outer surface of the outer wall of the reaction tube, so that the nanoparticle reaction occurs actively in the annular spiral flow and the continuous mass synthesis of nanoparticles is enabled.

According to the third form of the present invention, since said ingredient liquid is preheated in a range of temperature where said nanoparticle is not synthesized, even if the solvent in the reaction tube heated at the synthesis temperature is mixed with the ingredient liquid set at a high temperature being at a little low level of the extent that nanoparticles are not synthesized when supplying the ingredient liquid, drop of the temperature is comparatively small, so that nanoparticles are generated in the liquid mixture in real time, and the generation efficiency of nanoparticles increases. The preheating temperature depends upon the nanoparticle reaction, and it can be adjusted according to the ingredient liquid.

According to the fourth form of the present invention, said reaction tubes with one or more steps are configured in a series form and/or a parallel form, and said spiral flow can be selected from a lift flow, a slope flow or a horizontal flow. When the synthesis density of nanoparticles is insufficient only by the first step reaction tube, the second step reaction tube can be connected in series, and furthermore the series step number can be increased to the third step or the fourth step. Additionally, in the mass synthesis of nanoparticles, a plurality of reaction tubes can be disposed in parallel at the first step so that nanoparticles can be produced simultaneously and parallel in each reaction tube and a plurality of reaction tubes can be connected in series at the second step. As thus described, depending on the mass production purpose, a parallel number and a series number can be adjusted. Since by one step the synthesis time of nanoparticles can be done shorter and by multi steps the synthesis time of nanoparticles can be done longer, it is possible to adjust the synthesis time of nanoparticles shorter or longer freely.

Additionally, in the case of series, when the first step is set to be the fall flow, the second step can be set to be the lift flow, so that it is possible to adopt the series form by adjusting the fall flow and the lift flow appropriately. In addition, when the vertical direction is defined as the height type and the horizontal direction is defined as the side type, there are three forms in the reaction tube as the height type reaction tube, the side type reaction tube and the slope type reaction tube, so that it is possible to adjust the arrangement form appropriately.

According to the fifth form of the present invention, the nanoparticle production method is provided, wherein said solvent and said ingredient material react at said synthesis temperature, so that said nanoparticle is manufactured. As to the nanoparticle defined in the present invention, the particle size is in a range of 1 nm to 1000 nm in diameter, and it is not asked whether its particle surface is coated with the modifying substance (organic substance, for example). In the present form, it is insisted that the solvent and the ingredient material react in a heating state, so that the nanoparticles are generated. By way of example only, as shown in the patent document 2, when alcohol and silver carbonate react in a heating state, a silver core precipitates from silver carbonate by the reducing power of alcohol and the organic substance originated from alcohol is coated around the silver core. At this time, alcohol is a solvent, a reducing agent and an organic substance, simultaneously. In the present form, there are included all cases that the solvent and the ingredient material react to generate nanoparticles.

According to the sixth form of the present invention, the nanoparticle production method is provided, wherein said ingredient material contains a direct ingredient material and a reducing agent, and said direct ingredient material is reduced by said reducing agent in said solvent so that said nanoparticle is manufactured. As for the present form, the solvent does not contribute to the nanoparticle generation reaction directly, and the solvent is equivalent to a case giving only a reaction bath. There are many cases in such a reaction system, and for example, there is the example in which water as a solvent, silver nitrate and organic substance as a direct ingredient material and reducing agent are included. Concretely, silver nitrate dissolves in the water, silver precipitates to form the silver core by the reducing agent, and there is generated the nanoparticle in which the organic substance is coated around the silver core. In the present form, there are included all cases that the direct ingredient material and the reducing agent react in the solvent to generate nanoparticles. There is a case that a dissolution accelerating substance is doped to make the organic substance dissolve in water.

According to the seventh form of the present invention, the nanoparticle production method is provided, wherein there is added one or more processes selected from a manufacturing process of said ingredient liquid, a manufacturing process of an enrichment liquid in which a concentration of said nanoparticle is increased by enriching of said generation liquid after manufacturing said generation liquid and a drying process of said enrichment liquid by which dries said enrichment liquid up more. According to the present invention, because nanoparticles are generated by the liquid phase method, the generation liquid that nanoparticles are dispersed is produced, where the generation process of nanoparticles means the generation liquid manufacturing process. In order to make the form using the nanoparticle in the liquid phase method, there must be passed four processes configured from the ingredient liquid manufacturing process→the generation liquid manufacturing process→the generation liquid enrichment process→the enrichment liquid dry process. The essential point of the present invention exists in the generation liquid manufacturing process (namely, nanoparticle manufacturing process), and in the present form, there is provided the continuous production method in which one or more processes selected from the ingredient liquid manufacturing process, the generation liquid enrichment process and the enrichment liquid dry process are added to the generation liquid manufacturing process.

According to the eighth form of the present invention, the nanoparticle production method is provided, wherein the manufacturing process of said enrichment liquid includes the steps of spraying said generation liquid into a decompression container so that the solvent is vaporized from said generation liquid and recovering said enrichment liquid in which the concentration of said nanoparticle is increased. The enrichment liquid manufacturing process of the present form means after all the enrichment process of the generation liquid in which nanoparticles dispersed. As a result, it is preferable that the concentration of nanoparticle of the generation liquid is made increase by evaporating the solvent from the generation liquid. In the present form, if spraying said generation liquid into a decompression container, the solvent in the spray liquid droplet evaporates by the decompression, so that the spray liquid droplet whose concentration increased flows down and the enrichment liquid can be obtained by gathering these droplets. In order to raise up the concentration, it can be achieved by means of not only making the spray liquid droplet small, but also setting a plurality steps of spraying operation.

According to the ninth form of the present invention, the nanoparticle production method is provided, wherein the drying process of said enrichment liquid includes the step of doing vacuum drying of said enrichment liquid in a container so that at least the nanoparticle does not scatter. If performing the vacuum drying of the enrichment liquid, the solvent more can be removed and it is possible to increase the concentration of the enrichment liquid. However, when the solvent is completely removed, since the nanoparticles are scattered, it is not good for health. In the present form, the liquid is dried to the extent that the nanoparticles is not scattered, and it is possible to provide the nanoparticles in a wet state. If the nanoparticles wetting a little are kept in a sealed container, the nanoparticles are not scattered within atmospheric air, and it can be handled comparative safely although the attention is required in its dealing.

According to the tenth form of the present invention, there can be provided an nanoparticle production apparatus comprising a reaction tube filled with a solvent and/or an ingredient liquid for production of a nanoparticle that an ingredient material is mixed with said solvent, a temperature control unit controlling a temperature of said solvent and/or said ingredient liquid in said reaction tube at a synthesis temperature of said nanoparticle, an inflow end of said reaction tube supplying said ingredient liquid, a rotor forming a spiral flow along an inner surface of an outer wall in said reaction tube while said ingredient liquid supplied is mixed with said solvent of said reaction tube or while said ingredient liquid is stirred, and an outflow end of said reaction tube emitting a generation liquid including said nanoparticle while forming said nanoparticle from said ingredient material in said spiral flow.

In order to realize the nanoparticle production method explained with the first form, the apparatus of this form was developed. At first because there is disposed a reaction tube filled with the same solvent as an ingredient liquid for production of a nanoparticle that an ingredient material is mixed with said solvent, even if the ingredient liquid is supplied in the reaction tube, the combination of the solvent and the ingredient material do not vary at all, and the nanoparticles can be produced. In addition, when the ingredient liquid is filled inside of the reaction tube, the spiral flow is formed by stirring the ingredient liquid, and then the nanoparticles can be produced.

In the present apparatus, there can be realized the following two reactions that one is the case in which the solvent is the simple solvent and the nanoparticles are synthesized from the ingredient materials each other in the solvent, and the other is the case in which the solvent is one kind of liquid ingredient materials and the nanoparticles are synthesized through the reaction between the solvent and the ingredient materials. As an example of the former, when the solvent is water and the ingredient materials are nitric acid metal salt, organic matter and reducing agent, the nitric acid metal salt is reduced by the reducing agent so that an organic coated metal nanoparticle is synthesized.

In addition, as an example of the latter, as shown in the patent document 2, when the solvent is alcohol and the ingredient material is silver carbonate, the alcohol acts as reducing agent and organic matter as well solvent, a silver nanoparticle generated from silver carbonate reduced by the alcohol is coated with the organic matter originated from the alcohol, so that a metal nanoparticle is generated. As thus described, this invention is the apparatus realizing a liquid phase manufacturing apparatus of a wide nanoparticle. In addition, because there is disposed the temperature control device that said solvent of said reaction tube and/or said ingredient liquid are heated to the synthesis temperature of nanoparticle, the temperature of the interior of the reaction tube reached to the synthesis temperature.

Therefore, when the ingredient liquid supplied from the inflow end is mixed with the solvent of said reaction tube, or when the ingredient liquid is supplied from the inflow end, the ingredient liquid reaches to the synthesis temperature promptly, and the condition generating the nanoparticles is concluded. The higher the synthesis temperature is, the faster the synthesis rate of the nanoparticle is, and when the temperature of ingredient liquid is set at high temperature of the extent that synthesis does not start, the synthesis can be started as of the mixing promptly. Furthermore, by the rotation of the rotor, the mixed liquid is formed to the spiral flow streaming from said inflow end to the outflow end that goes around along a circumferential direction of the inner surface of the outer wall in said reaction tube. The ingredient liquid comes close to the inner surface of the outer wall in said reaction tube by the centrifugal force of the spiral flow, and the heavy ingredient material also comes close to the inner surface of the outer wall in said reaction tube by the centrifugal force, so that the nanoparticle is easy to be synthesized near the inner surface of the outer wall. When disposing the heating means such as the tape heater on the outer surface of the outer wall in the reaction tube, it is possible to synthesize the nanoparticle efficiently near the inner surface of the outer wall with the high heating efficiency. In addition, since constructing the spiral flow, it is possible to adjust the time arriving from the inflow end to the outflow end, namely, the reaction time, and especially although depending upon the length of the reaction tube, it is possible to arrange variably the reaction time from several seconds to several ten minutes by adjusting the pitch of the spiral flow (the distance advancing between one rotation). In addition, since the spiral flow is turbulent or a little turbulent, the nanoreaction is activated by increasing of the collision probability between materials, and the generation reaction of various nanoparticles can be realized with high efficiency. The present invention is completely different from the straight type of the laminar flow and the spiral tube type of the laminar flow as explained in the conventional embodiments.

Besides, by the amount that supplied ingredient liquid, the generation liquid is pushed out of the outflow end, and if the feed of the ingredient liquid is performed for continuity, it is advantageous in that the generation liquid can be also refined for continuity and it is possible to realize the mass synthesis of nanoparticles.

According to the eleventh form of the present invention, there is provided the nanoparticle production apparatus, comprising an rotating shaft disposed at a central position of said reaction tube, one or more separators fixed to the rotating shaft with an interval mutually, a partition formed between adjacent separators or between said separator and a tube end of said reaction tube, said rotor fixed to said rotating shaft in said partition, and an annular opening portion formed between an outer circumferential edge of said separator and said inner surface of said outer wall of said reaction tube, where an annular spiral flow streams through said partition because said spiral flow passes through said annular opening portion, so that said nanoparticle is formed in said annular spiral flow.

According to the eleventh form, said reaction tube is divided into one or more partitions along a streaming direction of said ingredient liquid, each partition is the region in a range from one separator to next separator, and in each partition the rotor is fixed to the rotating shaft. Because an annular opening portion is formed along an outer circumferential edge of a separator, the spiral flow driven by the rotor is changed to the annular spiral flow through said annular opening portion and streams through said partition. That is to say, although the ingredient liquid and the solvent of the reaction tube partially mix each other in the input side of first partition, most of ingredient liquid passes through said annular opening portion and flows into first partition, and while taking a step that it flows in from next annular opening portion to second partition, the ingredient liquid becoming the annular spiral flow goes to the outflow end from last partition. Therefore, synthesis of nanoparticle occurs in the continuous annular spiral flow with comparatively thin thickness, so that the diffusion of ingredient liquid can be suppressed and the nanoparticle can be generated approximately according to the concentration of ingredient liquid.

After it passes the first annular opening, the spiral flow stays temporarily in first partition while rotating, and after it passes next annular opening, the spiral flow stays temporarily in next partition while rotating, so that the residence time in the reaction tube gets longer than the spiral flow without the partition, and the generation reaction time of nanoparticles gets possible to be extended still more. Therefore, the reaction time becomes to be shortest in the case that there is no partition completely, and the increase of the installation number of partition gets possible to set the generation reaction time for the longer time. Furthermore, by driving the annular spiral flow, the ingredient material of the heavy weight remains in the inside of said annular spiral flow with the spiral centrifugal force, and the annular spiral flow located near the inner surface of the outer wall is heated efficiently by the heating means installed on the outer surface of the outer wall of the reaction tube, so that the nanoparticle reaction occurs actively in the annular spiral flow and the continuous mass synthesis of nanoparticles is enabled.

According to the twelfth form of the present invention, the nanoparticle production apparatus is provided, wherein in a top plate portion of said separator, one or more gas omission holes are opened. In the case that the reaction tube is the height type reaction tube or the side type reaction tube, when the nanoparticles are generated in the spiral flow or the annular spiral flow, there can be the thing that the generation gas occurs or the solvent evaporates. When these generation gas and evaporation gas rise, they are guided to the top plate portion, and the generation gas and evaporation gas pass upward through the gas omission hole, so that they are finally liquefied with the cooling apparatus in the upper portion of the reaction tube and the safe gas that is not liquefied is exhausted outside with the exhaust apparatus.

When the top plate portion is formed in the umbrella shape and the gas omission hole is formed near the center of the top plate portion, the gas rises along the inner surface of the top plate portion of the umbrella shape and the gas is easy to pass upward through the gas omission hole.

According to the thirteenth form of the present invention, the nanoparticle production apparatus is provided, wherein there is disposed a preheating apparatus that preheats said ingredient liquid in a range of temperature at which said nanoparticle is not synthesized before said ingredient liquid is supplied to said reaction tube. According to this thirteenth form, since said ingredient liquid is preheated in a range of temperature where said nanoparticle is not synthesized, even if the solvent in the reaction tube heated at the synthesis temperature is mixed with the ingredient liquid set at a high temperature being at a little low level of the extent that nanoparticles are not synthesized when supplying the ingredient liquid, drop of the temperature is comparatively small, so that nanoparticles are generated in the liquid mixture in real time, and the generation efficiency of nanoparticles increases.

The preheating temperature depends upon the nanoparticle reaction, and it can be adjusted according to the ingredient liquid.

According to the fourteenth form of the present invention, the nanoparticle production apparatus is provided, wherein said reaction tubes with one or more steps are configured in a series form and/or a parallel form, and said spiral flow in an inner portion of each reaction tube is selected from a fall flow, a slope flow or a lift flow. When the synthesis density of nanoparticles is insufficient only by the first step reaction tube, the second step reaction tube can be connected in series, and furthermore the series step number can be increased to the third step or the fourth step. Additionally, in the mass synthesis of nanoparticles, a plurality of reaction tubes can be disposed in parallel at the first step so that nanoparticles can be produced simultaneously and parallel in each reaction tube and a plurality of reaction tubes can be connected in series at the second step. As thus described, depending on the mass production purpose, a parallel number and a series number can be adjusted. Additionally, in the case of series, when the first step is set to be the fall flow, the second step can be set to be the lift flow, so that it is possible to adopt the series form by adjusting the fall flow and the lift flow appropriately. In addition, when the vertical direction is defined as the height type and the horizontal direction is defined as the side type, there are three forms in the reaction tube as the height type reaction tube, the side type reaction tube and the slope type reaction tube, so that it is possible to adjust the arrangement form appropriately.

According to the fifteenth form of the present invention, the nanoparticle production apparatus is provided, wherein there is added one or more apparatus selected from a manufacturing apparatus of said ingredient liquid, a manufacturing apparatus of an enrichment liquid in which a concentration of said nanoparticle is increased by enriching of said generation liquid after manufacturing said generation liquid and a drying apparatus of said enrichment liquid by which dries said enrichment liquid up more. According to the present invention, because nanoparticles are generated by the liquid phase method, the generation liquid that nanoparticles dispersed is produced, where the synthesis apparatus of nanoparticles means the generation liquid manufacturing apparatus. In order to make the form using the nanoparticle in the liquid phase method, there must be passed four apparatuses configured from the ingredient liquid manufacturing apparatus→the generation liquid manufacturing apparatus→the enrichment liquid manufacturing apparatus→the enrichment liquid dry apparatus. The essential point of the present invention exists in the generation liquid manufacturing apparatus (namely, nanoparticle manufacturing apparatus), and in the present form, there is provided the continuous manufacturing apparatus in which one or more apparatuses selected from the ingredient liquid manufacturing apparatus, the enrichment liquid manufacturing apparatus and the enrichment liquid dry apparatus are added to the generation liquid manufacturing apparatus.

According to the 16th form of the present invention, there is provided a nanoparticle automatic production apparatus comprising a nanoparticle production apparatus according to any one of said forms 10 to 15 and a computer control apparatus controlling said nanoparticle production apparatus by an electrical signal, so that said nanoparticle automatic production apparatus operates according to a program saved in said computer control apparatus and automatically controls said nanoparticle production apparatus. As explained in the fifteenth form, the completion form of the present production apparatus is the four apparatus combination body of the ingredient liquid manufacturing apparatus→the generation liquid manufacturing apparatus→the enrichment liquid manufacturing apparatus→the enrichment liquid dry apparatus. In addition, there are two apparatus combination body such as the ingredient liquid manufacturing apparatus→the generation liquid manufacturing apparatus, the generation liquid manufacturing apparatus→the enrichment liquid manufacturing apparatus, and the generation liquid manufacturing apparatus→the enrichment liquid dry apparatus, and then there are three apparatus combination body such as the ingredient liquid manufacturing apparatus→the generation liquid manufacturing apparatus→the enrichment liquid manufacturing apparatus, the ingredient liquid manufacturing apparatus→the generation liquid manufacturing apparatus→the enrichment liquid dry apparatus, and the generation liquid manufacturing apparatus→the enrichment liquid manufacturing apparatus→the enrichment liquid dry apparatus. In order to control these apparatus combination bodies electrically and continuously, the computer control apparatus is used.

BRIEF DESCRIPTION OF THE DRAWINGS

FIG. 4 is an outlined diagram of the separator used in the nanoparticle production apparatus concerning the present invention, (4A) is a longitudinal section diagram and (4B) is a front diagram.

FIG. 21(A)/(B) is an outlined explanatory diagram of patent document 2 showing the conventional apparatus.

FIG. 22 is an outlined explanatory diagram of patent document 3 showing the conventional apparatus.

BEST MODE FOR CARRYING OUT THE INVENTION

The First Example

Figure 1:
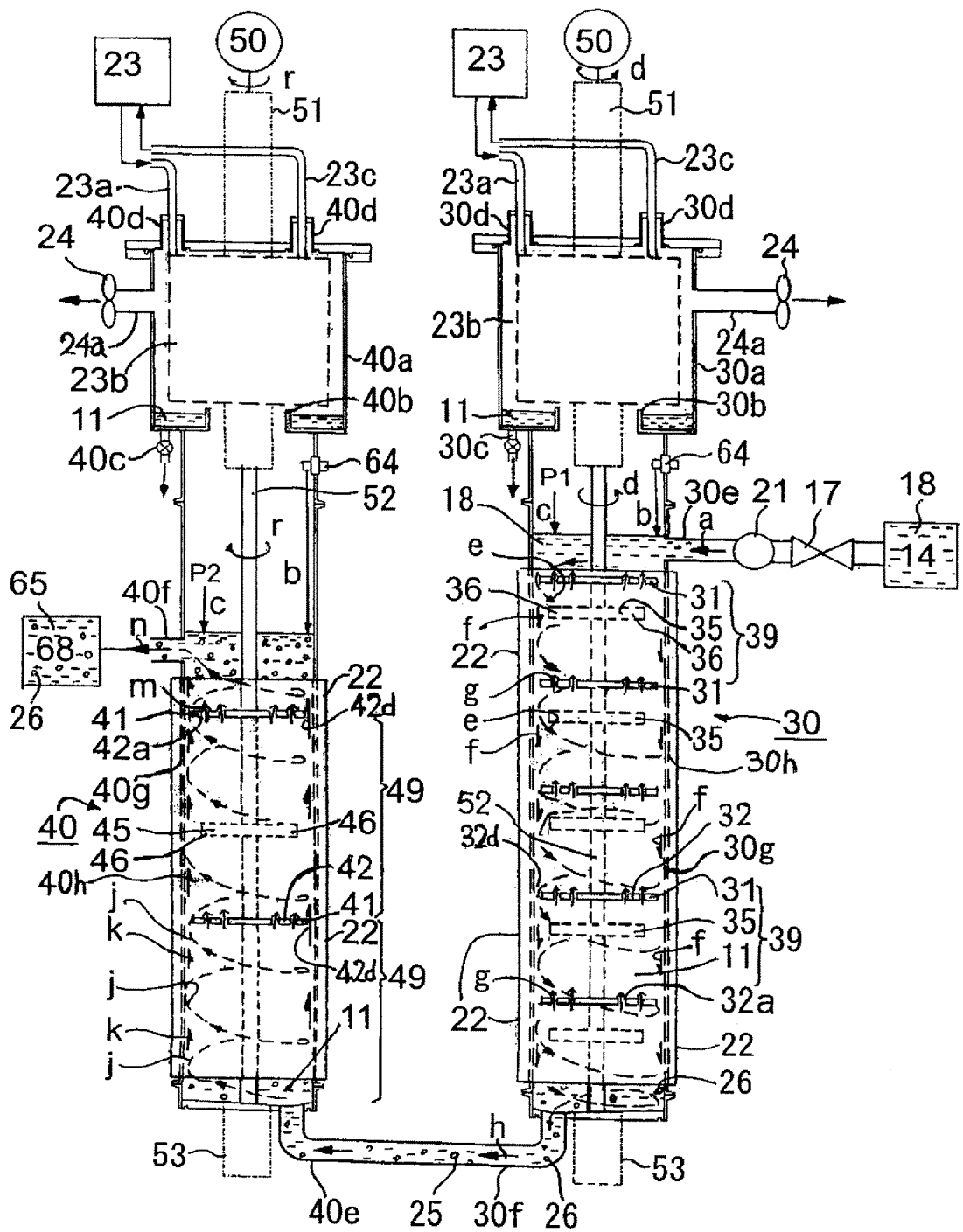
FIG. 1 is a front diagram of the first example of the nanoparticle production apparatus concerning the present invention, and the series type nanoparticle production apparatus of the first reaction tube (fall flow) and the second reaction tube (lift flow) is shown.

FIG. 1 is a front diagram of the first example of the nanoparticle production apparatus concerning the present invention, and the series type nanoparticle production apparatus of the first reaction tube (fall flow) and the second reaction tube (lift flow) is shown. In the following explanation, after explaining the outline regarding to the construction of the first example, the function of each member is explained along the streaming process of the ingredient liquid 18 in the ingredient liquid retention tank 14. In addition, in the first reaction tube 30 and the second reaction tube 40, the same code is referred to the same member or the member having a similar function and its description is omitted partly. In addition, the nanoparticle includes not only the nanoparticle without the organic coating layer but also the composite nanometal particle with the organic coating layer formed around the metal core, and the composite nanometal particle is simply called "nanoparticle" in the followings.

As for the first example shown in FIG. 1, there are in series connected the first reaction tube 30 and the second reaction tube 40, which are disposed through the outflow end 30f and the inflow end 40e communicated each other so as that first generation liquid 25 including nanoparticle 26 streams from the first reaction tube 30 to the second reaction tube 40 as shown in the arrow h. The first reaction tube 30 comprises the reaction tube head 30a and the reaction tube body portion 30g with communication, and one or more temperature control devices (heating apparatus) 22 are disposed around this reaction tube body portion 30g, so that the solvent 11 and the ingredient liquid 18 can be heated to a predetermined reaction temperature (synthesis temperature). Furthermore, to the upper portion of the reaction tube body portion 30g, through the electromagnetic valve 17, the pump 21 and the inflow end 30e, the ingredient liquid retention tank 14 is connected, so that the ingredient fluid 18 is streamed in a direction of arrow a with the pump 21 from this ingredient liquid retention tank 14, and the ingredient liquid 18 is supplied to the interior of the reaction tube body portion 30g.

In the same manner as the first reaction tube 30, the second reaction tube 40 comprises the reaction tube head 40a and the reaction tube body portion 40g with communication, and one or more temperature control devices (heating apparatus) 22 are disposed around this reaction tube body portion 30g, so that the solvent 11 and the first generation liquid 25 supplied from the inflow end 40e can be heated to a predetermined reaction temperature (synthesis temperature). Furthermore, the reaction tube body portion 40g is communicated to the generation liquid retention tank 68 through the outflow end 40f connected to its upper portion, and the generation liquid 65 streams in the arrow direction n, so that the generation liquid 65 generated in the first reaction tube 30 and the second reaction tube 40 is saved in the interior of the generation liquid retention tank 68. That is to say, in the nanoparticle production apparatus of the first example, the ingredient liquid 18 of the ingredient liquid retention tank 14 reacts in the first reaction tube 30 and the second reaction tube 40 connected in series, it is configured so that the generation liquid 65 is supplied to and saved in the interior of the generation liquid retention tank 68. In the first example of the nanoparticle production apparatus concerning the present invention, each of the first reaction tube 30 and the second reaction tube 40 is provided with the rotating shaft 52 which was connected to the rotation apparatus 50 through the rotation joint portion 51. By the separator 31, 41 and the rotor 35, 45 installed with this rotating shaft 52, it is the features that the spiral flows e, j are formed in the ingredient liquid 18 supplied to the first reaction tube 30 and the first generation liquid 25 supplied to the second reaction tube 40, and these are described later.

In the following, about the first example of the nanoparticle production apparatus shown in FIG. 1, with the explanation of other members such as the exhaust system, the function of each member is explained in consonance with the stream process of the ingredient liquid 18 in the ingredient liquid retention tank 14. The ingredient liquid 18 comprises the solvent dispersing and/or dissolving the ingredient material, and before the ingredient liquid 18 is supplied, the same solvent 11 as the solvent used in the ingredient liquid 18 is filled with the interior of the reaction tube body portion 30g of the of the first reaction tube 30 and the reaction tube body portion 40g of the second reaction tube 40. This solvent 11 is heated to a predetermined reaction temperature by the temperature apparatus (temperature control device) 22, and it is held. The synthesis temperature (heating temperature) by the temperature control device 22 may be different between the first reaction tube 30 and the second reaction tube 40. By way of example only, since the ingredient liquid 18 is supplied in the first reaction tube 30, its heating temperature is set higher than the second reaction tube 40, and most of the ingredient liquid 18 finish the reaction and nanoparticles are generated, so that the first generation liquid 25 including the unreacting ingredient material with nanoparticles 26 is supplied to the second reaction tube. Therefore, the heating temperature by the temperature control device 22 of the second reaction tube 40 can be changed, but it is set lower than the first reaction tube 30, so that a little unreacting part of said first generation liquid 25 reacts, and the nanoparticles are generated. In addition, in the ingredient liquid 18, as described before, the solvent dissolving/dispersing the ingredient material is same as said solvent 11, and for example, when the ingredient material comprises nitric acid metal salt, organic substance and reducing agent, water can be used as the solvent 11. In addition, as described in the patent document 2, when the ingredient material is silver carbonate, alcohol is used for solvent 11.

Next, the reaction process of ingredient liquid 18 in the first reaction tube 30 is explained in detail At first, as shown in FIG. 1, the solvent 11 is filled within the interior of reaction tube body portion 30g of the first reaction tube 30, and while it is stirred by the blade 36 of plural rotors 35, it is heated to a predetermined reaction temperature by means of the temperature control device 22 uniformly. This reaction temperature is good in the temperature greater the reaction starting temperature that the ingredient material starts to react with the solvent, and it is adjusted appropriately depending on the fall rate of the ingredient liquid 18. Moreover, said temperature control device 22 comprises the band heater arranged around the reaction tube body portion 30g. Said plural rotors 35 are arranged on the rotating shaft 52 connected to the rotation apparatus 50 through the rotation joint portion 51, and they can rotate in a direction of arrow d or its reverse direction with an appointed rotation speed by driving of the rotation apparatus. Further, said rotating shaft 50 is installed with a stability by means of axle box bearing 53 such as bearing and seal, and the rotation joint portion 51 also is configured from bearing or seal, so that the sealing performance in the rotation mechanism of the first reaction tube 30 is held.

When the ingredient liquid 18 is preheated to the preheating temperature lower than the reaction starting temperature in the ingredient liquid retention tank 14, as stated above, the electromagnetic valve 17 becomes the open state, so that it streams in the arrow a direction from the inflow end 30e by means of the pump 21 and is supplied to the reaction tube body portion 30g in which the solvent 11 of the reaction temperature is stirred. In the reaction tube body portion 30g, the region between the separator 31 and its downward separator 31 is named as the partition 39, and there are arranged plural partitions in the interior of the reaction tube body portion 30g, where the rotor 35 with one blade 36 is disposed in this partition 39. The partition 39 located at the lowest portion of the reaction tube body portion 30g is the partition existing in the region between the separator 31 and the base of the reaction tube body portion 30g. Therefore, the ingredient material included in the ingredient liquid 18 does not spread immediately to the lower part of the reaction tube body portion 30g, and the ingredient liquid 18 passes the annular opening 32d formed between the outer circumferential edge 32b of the separator 31 and the inner surface of the reaction tube body portion 30g. The ingredient liquid 18 is stirred with the solvent 11, and by forming the annular spiral flow e while being mixed, it passes the annular opening portion 32d. Therefore, when the ingredient liquid passes the partition 39, it is stirred and mixed with the rotor 35 so as to form the annular spiral flow e, and falls down as the fall flow f while reacting with the solvent 11 being at the reaction temperature. Because the annular spiral flow e is formed, the heavy ingredient material approaches the inner surface of the reaction tube body portion 30g by the centrifugal force, so that the nanoparticles are synthesized with the high efficiency near this inner surface. Furthermore, by forming the annular spiral flow e, it is possible to adjust the reaction time, namely the time arriving from the inflow end 30e to the outflow end 30f. Although depending upon the length of the reaction tube body portion 30g, on the basis of the number of the partitions 39 and the rotation speed of the rotor 35 etc., by adjusting the pitch of the spiral flow e (the proceeding distance per one rotation), it is possible to arrange variably the reaction time from several minutes to several tenth minutes. Though the ingredient liquid 18 is mixed partially with the solvent 11 in the input side of the first partition 39, most of the ingredient liquid 18 enters the first partition 39 and enter the second partition 39 positioned under, so that while holding the annular spiral flow e, it moves toward to the outflow end 30f. Therefore, the diffusion of the ingredient liquid 18 can be restrained and the nanoparticles can be generated according to the concentration of the ingredient liquid 18 almost. In addition, the generation gas g occurring by the reaction between the ingredient material and the solvent passes through the gas omission holes 32a of the separator 35 and rises, it is cooled in said reaction tube head 30a. The cooling mechanism is described below.

In the first example shown in FIG. 1, as described before, the first reaction liquid 25 is supplied to the inflow end 40e connected to the lower portion of the reaction tube body portion 40g of the second reaction tube 40. Although the nanoparticle 26 is generated in the reaction of the first reaction tube 30, the ingredient material unreacting is included in the first reaction liquid 25, and the reaction of the ingredient material is finished completely or almost completely in the second reaction tube 40, so that the generation liquid 65 including nanoparticle 26 is supplied from the second reaction tube 40 to the generation liquid retention tank 68 and is saved. Also in the reaction tube body portion 40g of the second reaction tube 40, there is formed the partition 49 that is the region from the base of the reaction tube body portion 40g to the separator 41 located intermediately, and in its upper portion there is formed the partition 49 that is the region from the separator 41 to the separator 41. In the upper partition 49, the rotor 45 having the blade 46 for agitation is installed to the rotating shaft 52, which is turned in a direction of arrow r or a reverse direction, so that by the rotor 45 installed the solvent 11 and the first generation liquid 25 are agitated and mixed. At early stage, the solvent 11 heated to the synthesis temperature (reaction temperature) is filled up with the reaction tube body portion 40g, and the first generation liquid 25 is supplied from the inflow end 40e. It is not illustrated, but between the outflow end 30f and the inflow end 40e, the electromagnetic valve and the flow controller can be arranged, and the first generation liquid 25 of more appropriate amount can be supplied appropriately. At the reaction tube body portion 40g of the second reaction tube 40, the lift flow k is formed, but the annular spiral flow j is formed with the same mechanism as the first reaction tube 30. The first rolling mechanism of rotor 45 in the second reaction tube 40 is similar to reaction tube 30, and detailed description is omitted.

The annular opening portion 42d is provided between the inner surface of the reaction tube body portion 40g in the second reaction tube 40 and the outer circumferential edge of the separator 41 having the top plate portion 42, so that the lift flow k passes this annular opening portion 42d as well as the first reaction tube 30, and because the lift flow k is stirred and mixed in the partition 49, the annular spiral flow j is formed. Therefore, by the centrifugal force, the heavy ingredient material approaches to the inner surface of the reaction tube body portion 40g heated, so that the nanoparticle 26 is synthesized with high efficiency in proximity of this inner surface, and the ingredient liquid 18 reacts almost perfectly in the first reaction tube 30 and the second reaction tube 40, and then the generation liquid 65 in which nanoparticles 26 are generated is supplied to the generation liquid retention tank 68.

Here, let us explain the cooling means in the reaction tube head 30a, 40a. In FIG. 1, as described above, since the ingredient liquid 18 including the same solvent as the solvent 11 and the first generation liquid 25 are heated in the first reaction tube 30 and the second reaction tube 40, the cooling means of the solvent 11 evaporated is installed in the reaction tube head 30a, 40a. For this cooling means, it flows the chilled water which is supplied through the input tube 23a from the generation gas cooling apparatus 23, and there is disposed the spiral tube 23b expressed with the dotted line that collects the water to the generation gas cooling apparatus 23 from the output tube 23c. Because the spiral tube 23b is cooled by the circulation of the chilled water, the solvent 11 evaporating at the reaction tube body portion 30g, 40g arrives at the perimeter of the spiral tube 23b and its neighborhood, and its one part is liquefied and drips into the annular receiving portion 30b, 40b by heat exchange. The solvent 11 saved in the annular receiving portion 30b, 40b is emitted from the drain valve 30c, 40c and is collected appropriately. From the reaction tube body portion 30g, 40g, said generation gas g, m occurring with the reaction rise up to the interior of the reaction tube head 30a, 40a, and these generation gas g, m are cooled, too. By way of example only, in the case that the ingredient material is silver carbonate and the solvent 11 is alcohol, carbon dioxide gas as the generation gas g, m occurs and rises to the interior of the reaction tube head 30a, 40a.

In each reaction tube head 30a, 40a of the first reaction tube 30 and the second reaction tube 40, each pressure P1, P2 are monitored by the pressure gage (not shown), and each pressure P1, P2 are adjustable independently with the exhaust apparatus 24 connected to the exhaust tube 24a. The level indicators 64 are installed in the first reaction tube 30 and the second reaction tube 40, respectively, and the height of the liquid level is controlled by means of each pressure P1, P2. That is to say, the distance to each level indicator 64 shown by arrow b is measured, and each pressure P1, P2 are adjusted independently with the exhaust apparatus 24 so as to keep in the height of a predetermined liquid level, and it is pressurized in the direction of arrow c. As the level indicator 64, the supersonic type level gauge is used, and as the exhaust apparatus 24, there is used the constant-pressure valve that the pressure control is possible. In the gas emitted from the exhaust apparatus 24, there is a case that the vapor of the solvent 11 is contained with the generation gas g to a very small amount, and it is desirable that it is perfectly liquefied by the heat exchanger etc. and removed.

The Second Example

Figure 2:
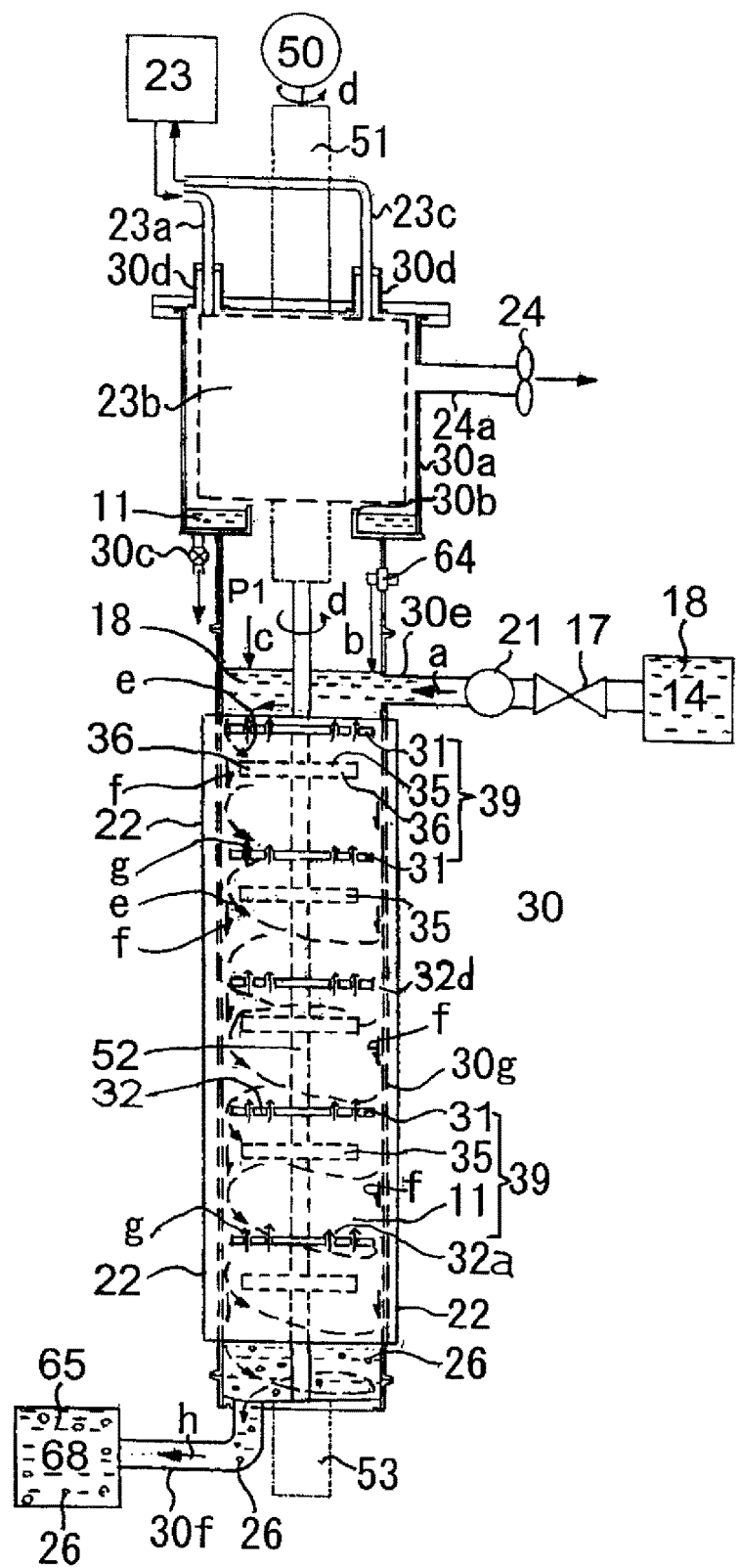
FIG. 2 is a front diagram of the second example of the nanoparticle production apparatus concerning the present invention, and the nanoparticle production apparatus of single reaction tube (fall flow) is shown.

FIG. 2 is a front diagram of the second example of the nanoparticle production apparatus concerning the present invention, and the nanoparticle production apparatus of single reaction tube (fall flow) is shown. In the second example, the reaction rube is composed of only the first reaction tube 30 which is shown in FIG. 1, and a difference with the first example is that the generation liquid retention tank 68 is connected to the outflow end 30f and the generation liquid 65 is saved. Therefore, the same code is referred to the same member, and as far as there is not special dissimilarity, the detailed description is omitted.

In the second example of FIG. 2, the reaction of the ingredient material and the solvent 11 in the ingredient liquid 18 is completed or approximately completed in the first reaction tube 30, and the nanoparticle 26 is generated. The reaction time can be appropriately arranged based upon adjusting of the supply flow rate of ingredient liquid 18 with pump 21 and the agitation condition by rotation speed of rotation apparatus 50, adjusting of the synthesis temperature (heating temperature) by the temperature control device 22 and adjusting of pressure P1 with the exhaust apparatus 24 etc., so that the nanoparticle 26 is generated from the ingredient liquid 18 only by means of the first reaction tube 30, and the generation liquid 65 is saved in the generation liquid retention tank 68. The fall flow of ingredient liquid 18 is stirred and mixed as the annular spiral flow e (called the fall spiral flow, too), and the reaction occurs through falling down in the same manner as the first reaction tube 30 shown in FIG. 1, and the description more than this is omitted.

The Third Example

Figure 3:
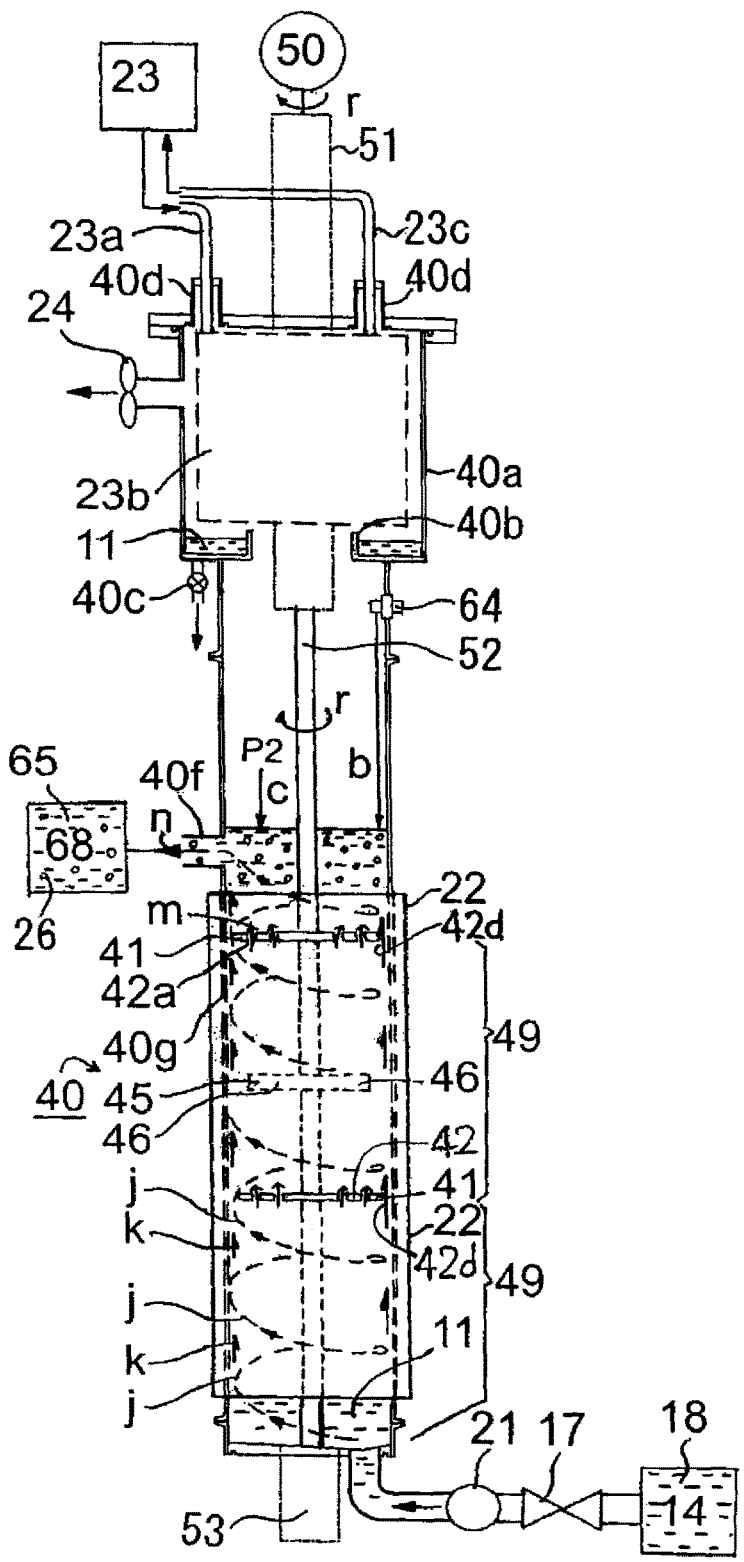
FIG. 3 is a front diagram of the third example of the nanoparticle production apparatus concerning the present invention, and the nanoparticle production apparatus of single reaction tube (lift flow) is shown.

FIG. 3 is a front diagram of the third example of the nanoparticle production apparatus concerning the present invention, and the nanoparticle production apparatus of single reaction tube (lift flow) is shown. In the third example, the reaction rube is composed of only the second reaction tube 40 which is shown in FIG. 1, and a difference with the first example is that the ingredient liquid retention tank 14 is connected to the bottom face of the second reaction tube 40 through the electromagnetic valve 17 and the pump 21 and the ingredient liquid 18 is supplied from this ingredient liquid retention tank 14 and from the lower portion of the second reaction tube 40. In the same manner, the same code is referred to the same member, and the detailed description is omitted.

In the third example of FIG. 3, the ingredient liquid 18 is directly supplied to the second reaction tube 40, and although the lift flow k (called the lift annular spiral flow, too) is formed by the pump, in the same manner as the second reaction tube 40 shown in FIG. 1, the annular spiral flow j (lift spiral flow) rising in each partition 49 is formed.

In the third example, the reaction of the ingredient material and the solvent 11 in the ingredient liquid 18 is completed or approximately completed in the second reaction tube 40, and the nanoparticle 26 is generated. In the same manner as the second example, the reaction time can be appropriately arranged based upon adjusting of the supply flow rate of ingredient liquid 18 with pump 21 and the agitation condition by rotation speed of rotation apparatus 50, adjusting of the synthesis temperature (heating temperature) by the temperature control device 22 and adjusting of pressure P1 with the exhaust apparatus 24 etc., so that the nanoparticle 26 is generated from the ingredient material included in the ingredient liquid 18 only by means of the first reaction tube 30, and the generation liquid 65 including this nanoparticle 26 is supplied and saved in the generation liquid retention tank. The lift flow k of ingredient liquid 18 is stirred and mixed as the annular spiral flow j (called the lift spiral flow, too), and the reaction occurs through lifting up in the same manner as the second reaction tube 40 shown in FIG. 1, and the description more than this is omitted.

FIG. 4 is an outlined diagram of the separator 31 (41) used in the nanoparticle production apparatus concerning the present invention, (4A) is a longitudinal section diagram and (4B) is a front diagram. Since the separators 31, 41 shown in FIG. 1 to FIG. 3 comprise the same construction, the code 31 (41) is referred to "separator", and in the same manner, as the second reaction tube 40 is the same as the first reaction tube 30 of FIG. 1, the code of the second reaction tube 40 is shown in the parenthesis.

The separator 31 (41) comprises the top plate portion 32 (42) and the annular portion 33 (43), the annular portion 33 (43) is fixed to the rotating shaft 52 by means of the locking bolt 34 (44), and the separator 31 (41) rotates in the direction of arrow d (r) along with the rotating shaft 52. As described earlier, the gas omission holes 32a (42a) is formed in the top plate portion 32, and the generation gas occurring in the reaction can be ejected upward. According to an amount of the generation gas occurring and the ingredient liquid supplied, size and the number of gas omission hole 32a (42a) are regulated. In addition, the annular opening portion 32d (42d) is formed between the outer circumferential edge 32b (42b) of the top plate portion 32 (42) and the outer wall 30h (40h) of the reaction tube 30 (40), and the lift flow k (or called the lift annular spiral flow, too) or the fall flow f (or called the fall annular spiral flow, too) streams through this annular opening portion 32d (42d).

Figure 5:
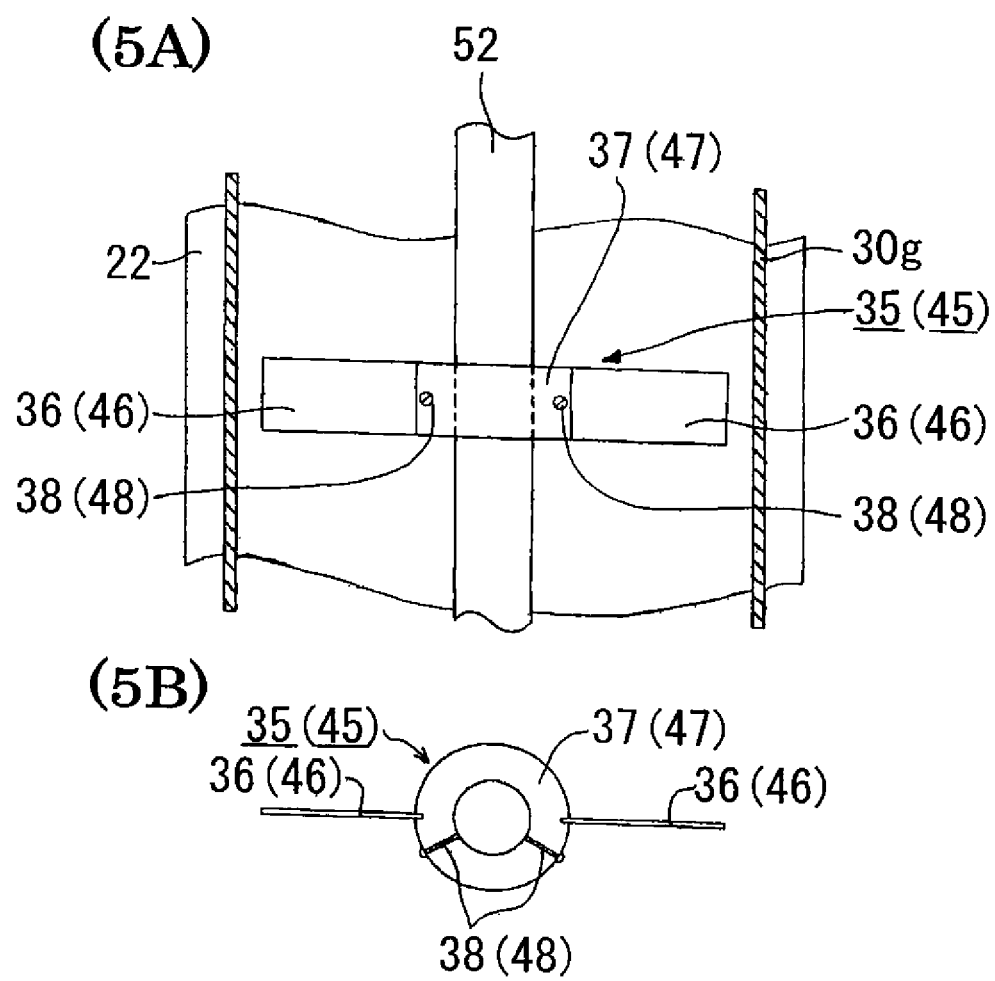
FIG. 5 is an outlined diagram of the rotor used in the nanoparticle production apparatus concerning the present invention, (5A) is a longitudinal section diagram and (5B) is a front diagram.

FIG. 5 is an outlined diagram of the rotor 35 (45) used in the nanoparticle production apparatus concerning the present invention, (5A) is a longitudinal section diagram and (5B) is a front diagram. In the same manner as FIG. 4, the rotors 35, 45 comprise the same construction in the first reaction tube 30 and the second reaction tube 40 shown in FIGS. 1-3, and the code of the second reaction tube 40 is shown in the parenthesis. The rotor 35 (45) comprises the blade 36 (46) and the annular portion 37 (47), the annular portion 37 (47) is fixed to the rotating shaft 52 by means of the locking bolt 38 (48), and the blade 36 (46) rotates with the rotating shaft 52, so that the solvent and the ingredient liquid etc. are stirred and mixed.

The Fourth Example

Figure 6:
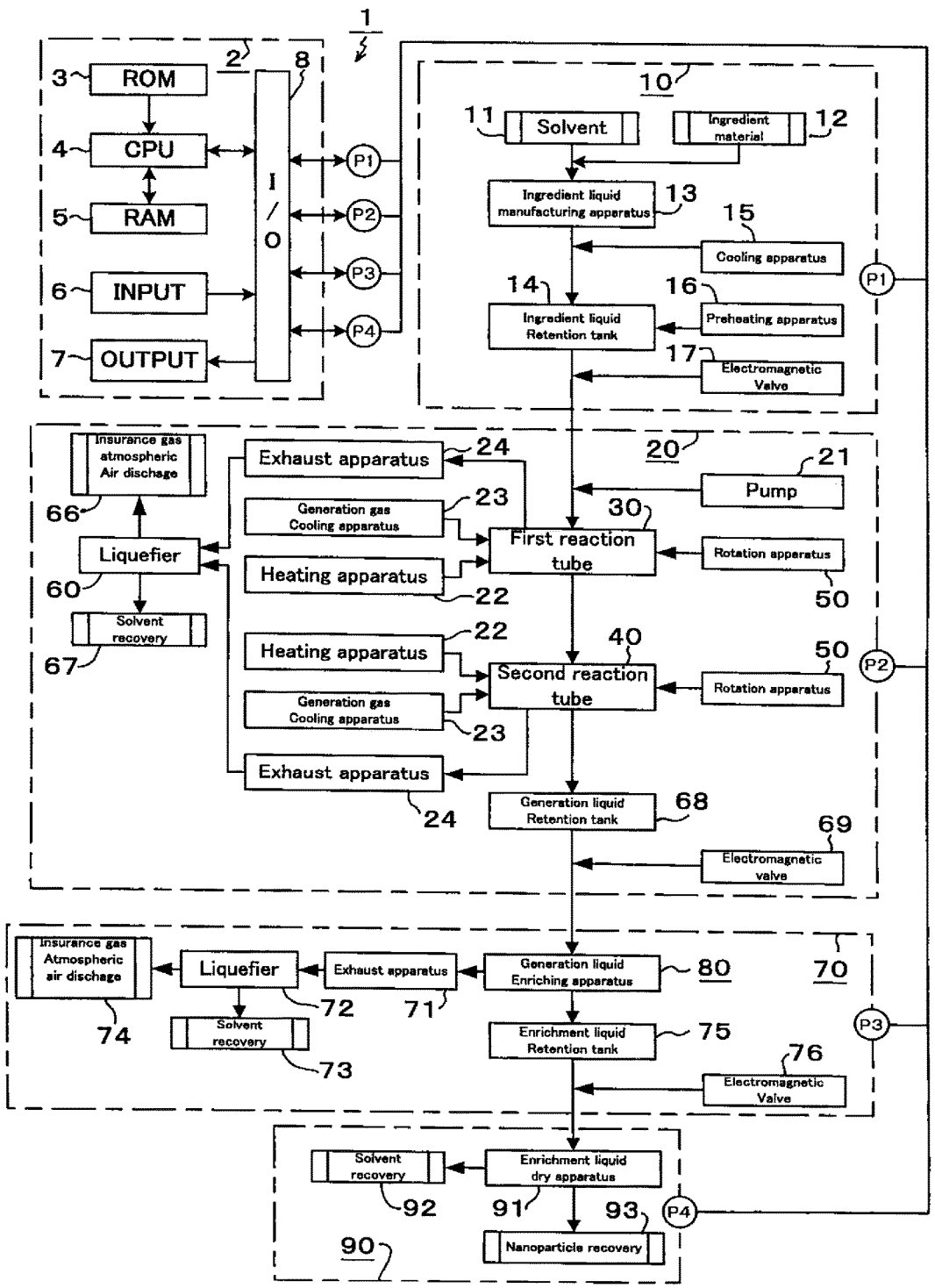
FIG. 6 is a block diagram of the fourth example of the nanoparticle production apparatus concerning the present invention, and shows the nanoparticle automatic production apparatus that the first reaction tube and the second reaction tube controlled by the computer are connected in series a series.

FIG. 6 is a block diagram of the fourth example of the nanoparticle production apparatus 1 concerning the present invention, and shows the nanoparticle automatic production apparatus that the first reaction tube 30 and the second reaction tube 40 controlled by the computer are connected in series a series. The nanoparticle production apparatus 1 comprises the computer control apparatus 2, the ingredient liquid manufacturing portion 10, the nanoparticle manufacturing portion 20, the generation liquid enriching portion 70 and the enrichment liquid dry apparatus 90, and they are connected by means of the computer control apparatus 2 and the terminal Q1 to Q4. That is to say, each of the terminals Q1 to Q4 of the ingredient liquid manufacturing portion 10, the nanoparticle manufacturing portion 20, the generation liquid enriching portion 70 and the enrichment liquid dry apparatus 90 is connected to each of Q1 to Q4 of the I/O port 8, respectively, so that they are automatically controlled due to the computer control apparatus 2, and the nanoparticles can be produced automatically and intermittently.

The computer control apparatus 2 comprises ROM3 recording the program, CPU4 performing the operation, RAM 5 inputting and outputting the operated results, INPUT6 inputting the set values or the operating modes from the external, OUTPUT7 outputting the measuring data and the operating state, and I/O port 8, where I/O port 8 inputs and outputs the data to CPU4, transforms the data from INPUT6 to the digital signal, and outputs each measuring data to OUTPUT7. Through terminals Q1 to Q4 connected to this I/O port 8, each of terminals Q1 to Q4 of the computer control apparatus 2, respectively, are connected to terminal Q1 of the ingredient liquid manufacturing portion 10, terminal Q2 of the nanoparticle manufacturing portion 20, terminal Q3 of the generation liquid enriching portion 70 and terminal Q4 of the enrichment liquid dry portion 90. When the set values and the operating mode are input through OUTPUT7 from the external, the orders are output through each terminal Q1 to Q4 from I/O port 8 based upon the operation of CPU 4, and the data are fed back to I/O port 8 through each terminal Q1 to Q4 from each portion, and they are output to CPU4. Therefore, if the set values and the operating mode are input from INPUT6, the nanoparticles are produced automatically, and the operation condition of the nanoparticle automatic production apparatus 1 can be monitored by OUTPUT7. As the computer control apparatus 2, a commercial personal computer can be combined with I/O port and PID controller or them, and it can employ.

The ingredient liquid manufacturing portion 10 of FIG. 6 comprises the ingredient liquid manufacturing apparatus 13 into which the solvent 11 and the ingredient material are supplied and the ingredient liquid is manufactured, the cooling apparatus 15 by which the ingredient liquid of the ingredient liquid manufacturing apparatus 13 is cooled, and the ingredient liquid retention tank 14 in which this ingredient liquid is saved and is preheated to a predetermined temperature lower than the reaction start temperature by the preheating apparatus. This ingredient liquid retention tank 14 is described in FIGS. 1-3, and a similar function is provided. Said ingredient liquid manufacturing apparatus 13 disperses, mixes and dissolves the ingredient material 12 to the solvent 11. Said ingredient liquid manufacturing apparatus 13 is constructed from a bead mill and a mixer etc., for example, in the bead mill apparatus, the cohered ingredient material is crushed in uniformity in the solvent by the minute bead particles and is dispersed in the solvent.

With a command from the computer control apparatus 2, the ingredient liquid manufacturing apparatus 13 is driven, and the solvent 11 and the ingredient material 12 are automatically supplied to the ingredient liquid manufacturing apparatus 13 with a predetermined flow rate which is set, so that there is manufactured the ingredient liquid that the ingredient material 12 is dispersed, mixed or dissolved in the solvent 11. At the same time, the cooling apparatus 15 is driven, and the ingredient liquid is manufactured while being cooled so that ingredient liquid does not cause the reaction. The ingredient liquid generated for a predetermined time is supplied to the ingredient liquid retention tank 14, and is held at a predetermined temperature less than the reaction start temperature with the preheating apparatus 16. By way of example only, in the case that the ingredient material is silver carbonate and the solvent is alcohol, it is held at about 60 degrees Celsius. When the ingredient liquid at a predetermined preheated temperature is saved, it is transmitted to the computer control apparatus 2 that the ingredient liquid can be supplied.

In FIG. 6, the nanoparticle manufacturing portion 20 includes most of structures of the first example shown in FIG. 1, wherein there are contained the structures such as the first reaction tube 30, the second reaction tube 40, the generation liquid retention tank 68, and the members installed with them as the pump 21, the heating apparatus 22 (temperature control device), the generation gas cooling apparatus 23, the exhaust apparatus 24, the rotation apparatus 50 and the electromagnetic valve 69, where the electromagnetic valve 69 is described in FIG. 1, so its detailed explanation is omitted.

The solvent 11 is filled in the first reaction tube 30 and the second reaction tube 40 beforehand, and there are driven the heating apparatus (temperature control device) 22, the generation gas cooling apparatus 23, the exhaust apparatus 24 and the rotation apparatus 50. When the temperature of the solvent 11 in the first reaction tube 30 and the second reaction tube 40 arrives at the reaction temperature, the liquid level is at the predetermined height and the pressure is kept less than the specified value by the exhaust apparatus 24 including the constant pressure valve, these things are transmitted to the computer control apparatus 2 from Q2. Namely it is transmitted to the computer control apparatus 2 that the ingredient liquid can be supplied to the nanoparticle manufacturing portion 20, so that the pump 21 is driven and the signal which sets the electromagnetic valve 17 of the ingredient liquid manufacturing portion 10 to be open is transmitted. In addition, in the continuous driving, since the ingredient liquid is manufactured continuously and there is manufactured the ingredient liquid by the same amount as the feed amount to the first reaction tube 30, the electromagnetic valve 17 is almost held to be the normally open condition and the feed amount of ingredient liquid is held at the specified value by the pump 21. As described in the explanation of FIG. 1, as for the reaction process in the nanoparticle manufacturing portion 20, when the annular spiral flow is formed in the first reaction tube 30 and the second reaction tube 40 and heated, the nanoparticles are generated, and the generation liquid comprising the solvent including nanoparticles is saved in the generation liquid retention tank 68.

Here, the temperature, the vapor pressure and the liquid level height of the first reaction tube and the second reaction tube are measured and they are transmitted to the computer control apparatus 2 through Q2, so that by the feedback control, the control signal is transmitted to the heating apparatus 22, the generation gas cooling apparatus and the exhaust apparatus 24, and the temperature, the vapor pressure and the liquid level height are automatically adjusted, as a result always a supervisor can monitor by OUTPUT7.

Furthermore, the liquefier 60 is installed with the nanoparticle manufacturing portion 20, and it is controlled with the computer control apparatus 2. The gas exhausted from the exhaust apparatus 24 includes the vapor of the solvent 11 which was not removed completely by means of the generation gas cooling apparatus 23 with the generation gas occurring by the reaction, and this vapor is liquefied by the liquefier 60 comprising the heat exchanger and so on. For example, the solvent 11 comprises from alcohol or water etc., and these materials can be completely liquefied. Therefore, the gas ejected from the exhaust apparatus 34 is separated to the solvent 11 and the generation gas, the generation gas is ejected by the insurance gas atmospheric air discharge 66 and the solvent 11 is collected by the solvent recovery 67.

The generation liquid enriching portion 70 of FIG. 6 is configured from the generation liquid enriching apparatus 80, the enrichment liquid retention tank 75, the exhaust apparatus 71, the liquefier 72, the solvent recovery 73, the insurance gas atmospheric air discharge 74 and the electromagnetic valve 76, the control signal is transmitted from the computer control apparatus 2 through the terminal Q3, and the measured values and operating state are fed back. In said nanoparticle manufacturing portion 20, when the generation liquid of the specified quantity is saved in the generation liquid retention tank 68, the electromagnetic valve 69 becomes to be the open condition and the generation liquid is supplied to the generation liquid enriching apparatus 80. In this stage, the generation liquid enriching apparatus 80 is set to be the condition at which the generation liquid can be supplied, the generation liquid is enriched by removing the solvent 11 from the generation liquid, and the enrichment liquid making the nanoparticle concentration increase is obtained. This enrichment liquid is supplied and saved from the generation liquid enriching apparatus 80 to the enrichment liquid retention tank 75, and when a specified amount is saved, the electromagnetic valve 76 becomes to be the open condition and it is supplied to the enrichment liquid dry portion 90. A specific example of the generation liquid enriching apparatus 80 is described below. With the exhaust apparatus 71 connected to this generation liquid enriching apparatus 80, the generation gas including the solvent 11 streams to the liquefier 72, and the solvent 11 is liquefied with the liquefier 72. This solvent 11 is collected with the solvent recovery 11, and the generation gas that the solvent 11 was removed is ejected to atmospheric air by the safe gas atmospheric air discharge 74.

The enrichment liquid dry portion 90 is configured from the enrichment liquid dry apparatus 91, the solvent recovery 92 and the nanoparticle recovery 93, and they are controlled through the terminal Q4 with the computer control apparatus 2. With the enrichment liquid dry apparatus 91, the solvent 11 included in the enrichment liquid is removed more, so that a dry condition is formed and nanoparticle are collected by the nanoparticle recovery 93. The solvent 11 removed by drying is collected by the solvent recovery 92.

The Fifth Example

Figure 7:
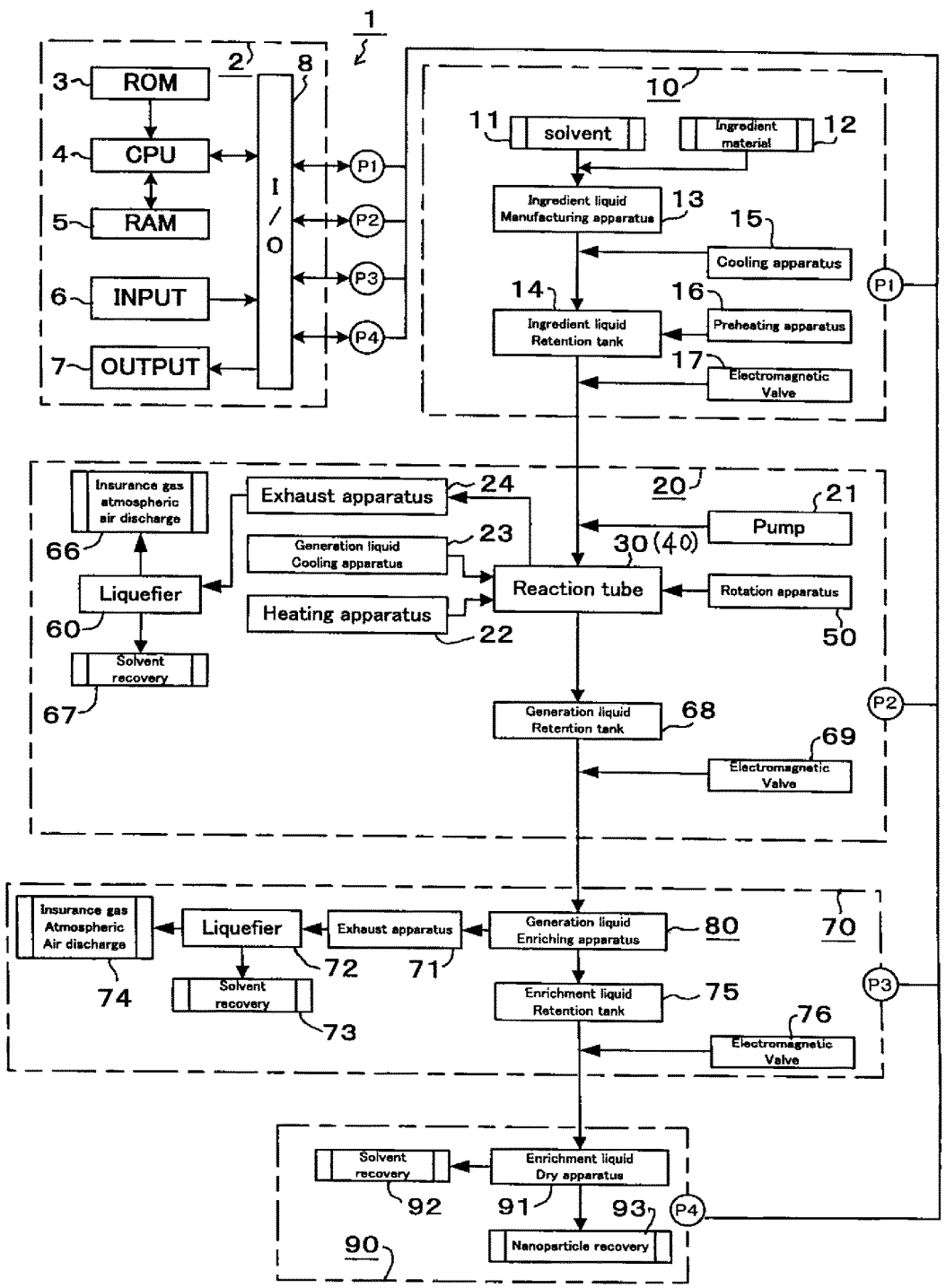
FIG. 7 is a block diagram of the fifth example of the nanoparticle production apparatus concerning the present invention, and shows the nanoparticle automatic production apparatus of the single reaction tube controlled by the computer.

FIG. 7 is a block diagram of the fifth example of the nanoparticle production apparatus concerning the present invention, and shows the nanoparticle automatic production apparatus of the single reaction tube controlled by the computer. In FIG. 7, the same code is referred to the same member as FIG. 6 and the description is omitted partly. Furthermore, the fifth example of FIG. 7 is the same as the fourth example of FIG. 6 except of the nanoparticle manufacturing portion 20, and it is described the nanoparticle manufacturing portion 20 because of doing the same action.

With the nanoparticle manufacturing portion 20 of FIG. 7, as indicated in FIG. 2 and FIG. 3, the reaction tube 30 (40) is single, and the first reaction tube 30 of FIG. 2 or the second reaction tube 40 of FIG. 3 is arranged. Therefore, the action aside from the reaction process and the reaction tube 30 (40) is the same as the fourth example of FIG. 6, and its description is omitted. In the nanoparticle manufacturing portion 20 of FIG. 7, because the reaction tube 30 (40) is single, as explaining in relation to the examples of FIG. 2 and FIG. 3, the generation of nanoparticles is done in the single reaction tube 30 (40). Depending on it, there are adjusted the things as the synthesis temperature (namely the heating temperature) by the temperature control device 22, the feed amount from the ingredient liquid retention tank 14 with the pump 21 and the agitation rate by the rotation apparatus 50, and the reaction rate and the reaction time are controlled with the computer control apparatus 2 so as that the generation of nanoparticles complete with the single reaction tube 30 (40).

Figure 8:
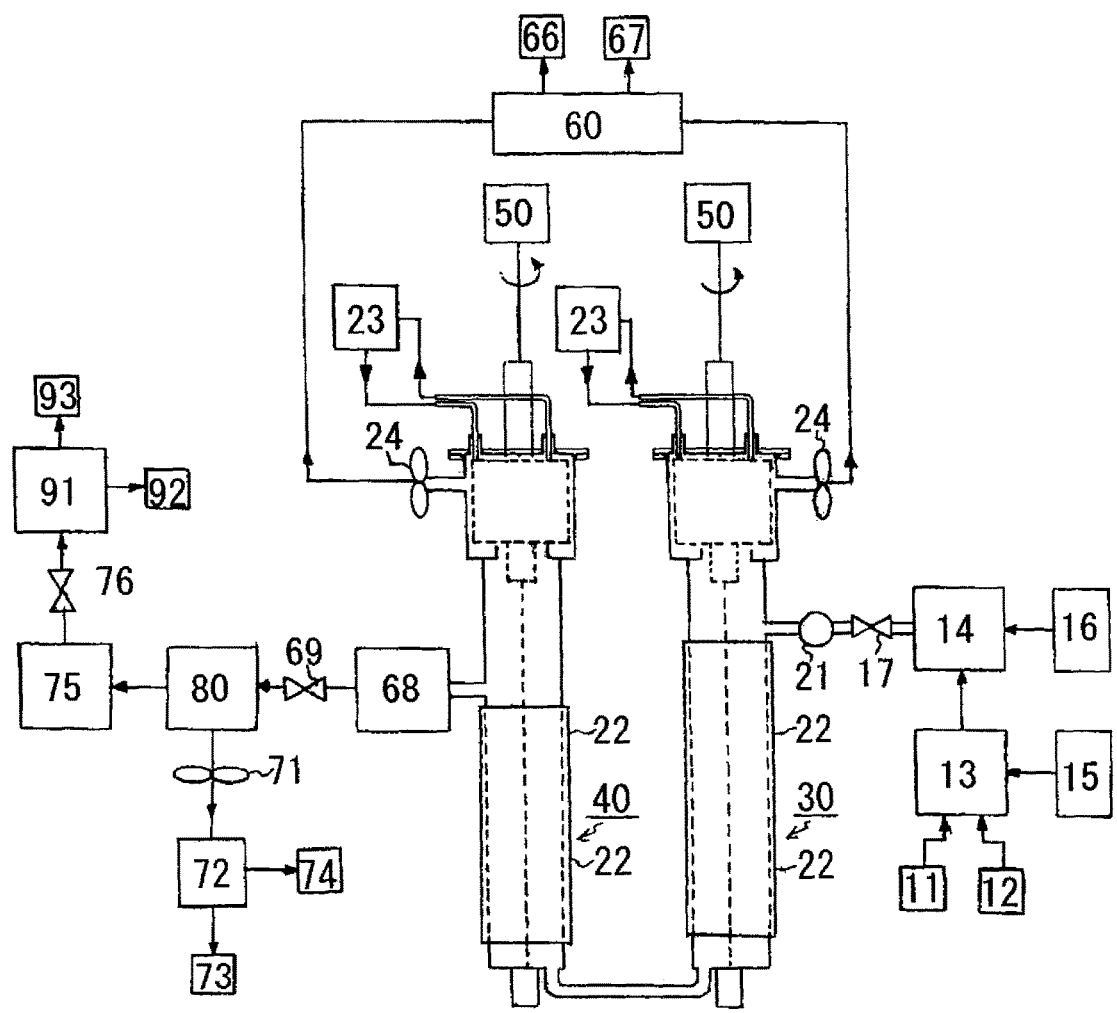
FIG. 8 shows a block diagram of the nanoparticle automatic production apparatus which showed the first reaction tube and the second reaction tube of FIG. 6.

FIG. 8 shows a block diagram of the nanoparticle automatic production apparatus which showed the first reaction tube and the second reaction tube of FIG. 6. Based on the first example shown in FIG. 1, FIG. 8 is in substance the same as the block diagram of the nanoparticle automatic production apparatus of FIG. 6. The explanation of the construction and its action is approximately omitted, because it is substantially the same as the explanation of FIG. 1 and FIG. 6. When it will be explained partly, the preheating apparatus 16 and the ingredient liquid manufacturing apparatus 13 is installed to the ingredient liquid retention tank 14, and the solvent 11 and the ingredient material 12 are supplied to the ingredient liquid manufacturing apparatus 13. The liquefier 60 is provided with the exhaust apparatus 24, and the solvent 11 and the generation gas are divided, so that the generation gas is ejected to the atmospheric air by the safe gas atmospheric air discharge 66, and the solvent 11 is collected with the solvent recovery 67. In the generation liquid retention tank 68, the generation liquid enriching apparatus 80 is installed through the electromagnetic valve 69, and from this generation liquid enriching apparatus 80, the enrichment liquid is supplied to the enrichment liquid retention tank 75, so that the enrichment liquid is dried with the enrichment liquid dry apparatus 91 and the nanoparticles are collected by the nanoparticle recovery 91. The solvent 11 removed with the enrichment liquid dry apparatus 91 is collected with the solvent recovery 92.

Figure 9:
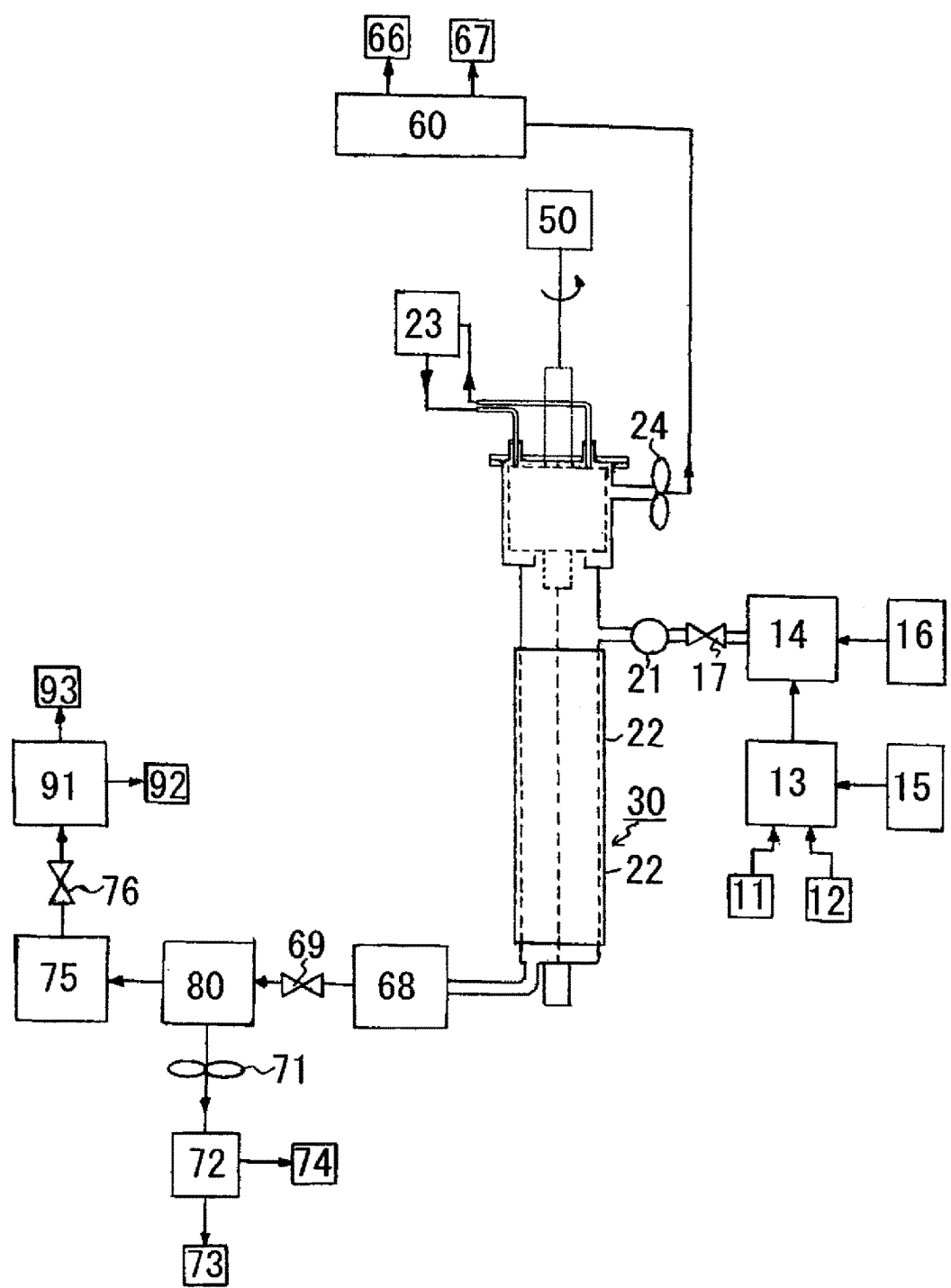
FIG. 9 shows a block diagram of the nanoparticle automatic production apparatus which showed the first reaction tube of FIG. 7.

FIG. 9 shows a block diagram of the nanoparticle automatic production apparatus which showed the first reaction tube of FIG. 7. FIG. 9 is based on the second example shown in FIG. 2, and is substantially the same as the block diagram of the nanoparticle automatic production apparatus of FIG. 7. Because the architecture and its description of operation are substantially the same as the explanation of FIG. 2, FIG. 7 and FIG. 8, they are approximately omitted. When it will be explained partly, in the inflow side of the first reaction tube 30 of FIG. 2, the preheating apparatus 16 and the ingredient liquid manufacturing apparatus 13 are installed to the ingredient liquid retention tank 14, and in the outflow side of the first reaction tube 30, the generation liquid enriching apparatus 80 is installed to the generation liquid retention tank 68 through the electromagnetic valve 69. In addition, the liquefier 60 is provided with the exhaust apparatus 24, and the solvent 11 and the generation gas are divided, so that the generation gas is ejected to the atmospheric air by the safe gas atmospheric air discharge 66, and the solvent 11 is collected with the solvent recovery 67. Because other architecture and action are the same as FIG. 8, the description more than this is omitted.

Figure 10:
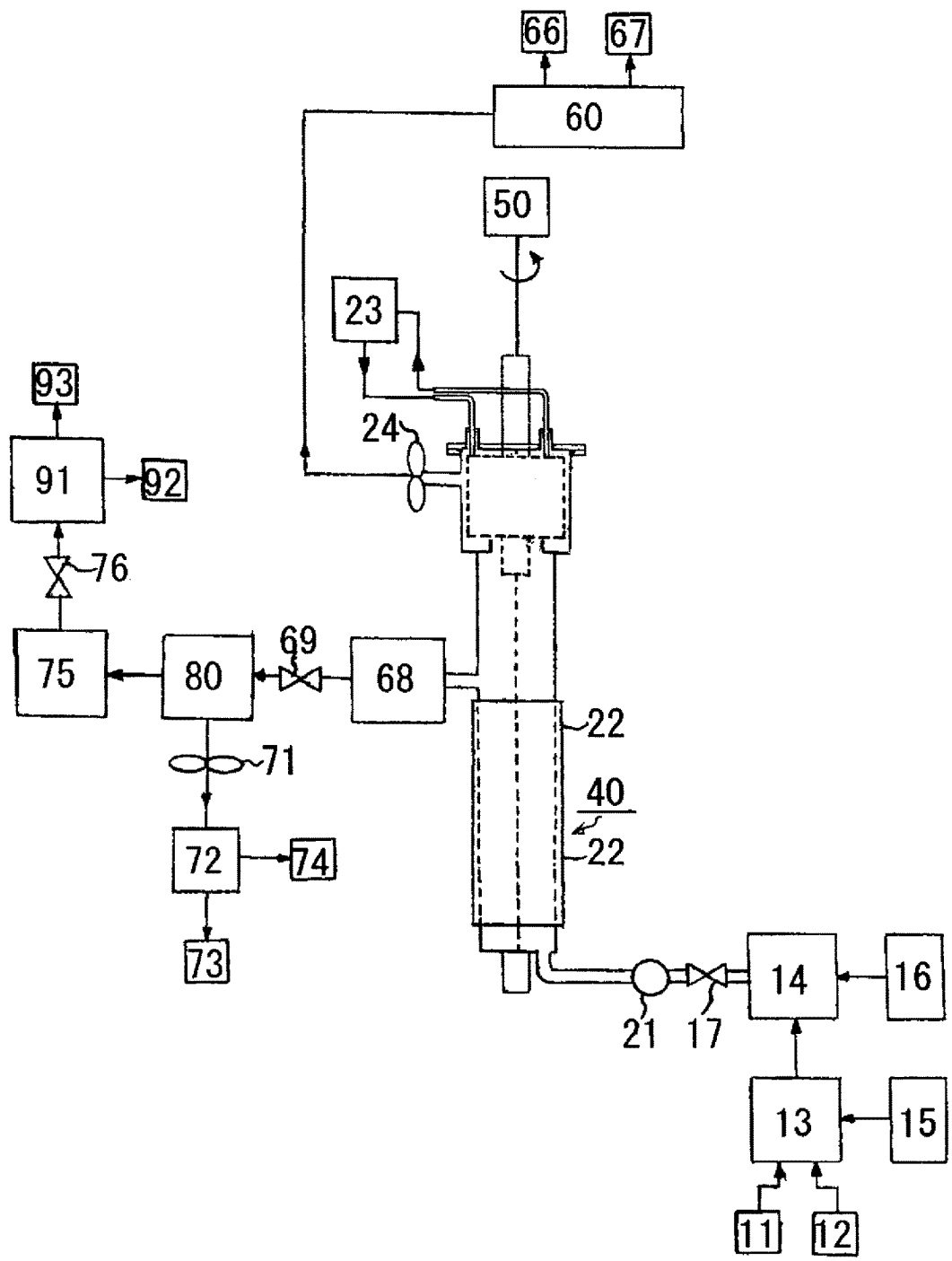
FIG. 10 shows a block diagram of the nanoparticle automatic production apparatus which showed the second reaction tube of FIG. 7.

FIG. 10 shows a block diagram of the nanoparticle automatic production apparatus which showed the second reaction tube of FIG. 7. FIG. 10 is based on the third example shown in FIG. 3, and is substantially the same as the block diagram of the nanoparticle automatic production apparatus of FIG. 7. Because the architecture and its description of operation are substantially the same as the explanation of FIG. 3, FIG. 7 and FIG. 9, they are approximately omitted. When it will be explained partly, in the inflow side of the first reaction tube 30 of FIG. 3, the preheating apparatus 16 and the ingredient liquid manufacturing apparatus 13 are installed to the ingredient liquid retention tank 14, and in the outflow side of the second reaction tube 30, the generation liquid enriching apparatus 80 is installed to the generation liquid retention tank 68 through the electromagnetic valve 69. In addition, the liquefier 60 is provided with the exhaust apparatus 24, and the solvent 11 and the generation gas are divided, so that the generation gas is ejected to the atmospheric air by the safe gas atmospheric air discharge 66, and the solvent 11 is collected with the solvent recovery 67. Because other architecture and action are the same as FIG. 9, the description more than this is omitted.

Figure 11:
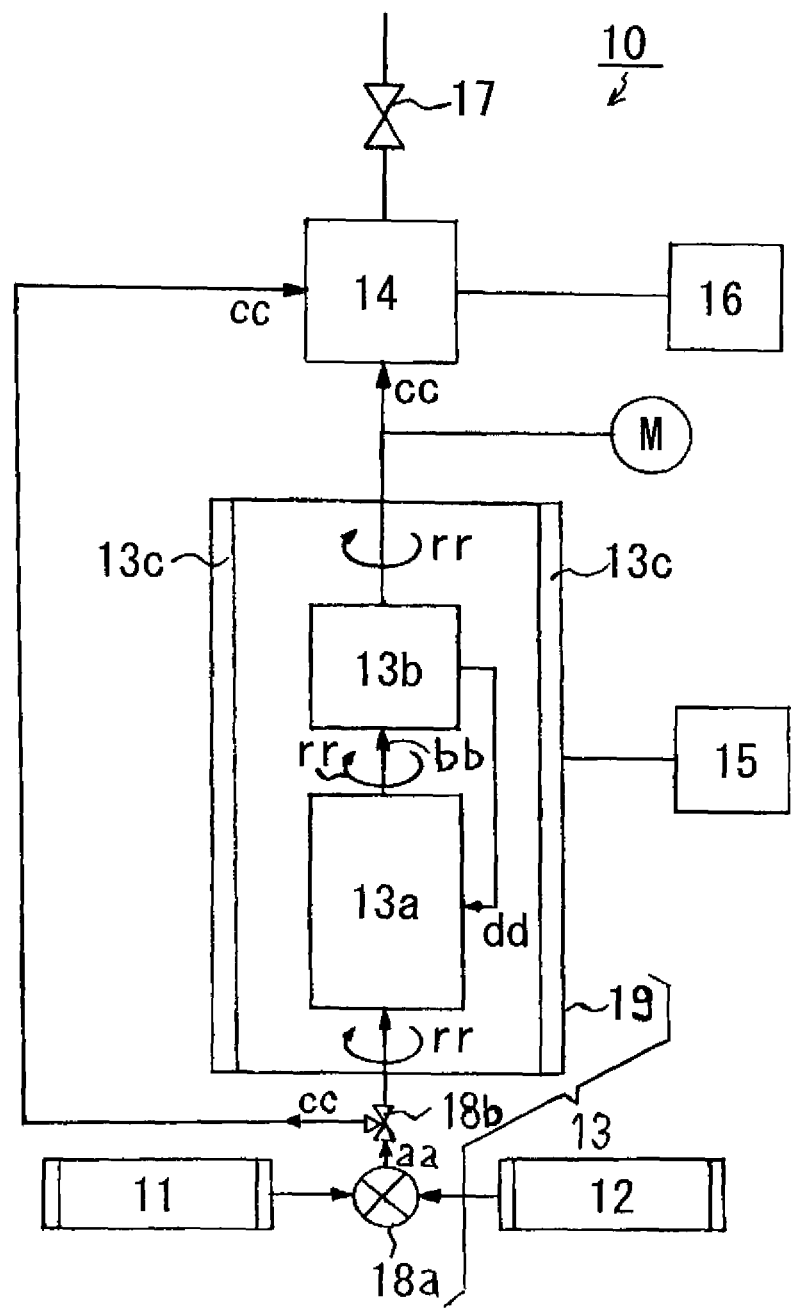
FIG. 11 is an outlined explanatory diagram of the ingredient liquid manufacturing portion shown in the nanoparticle automatic production apparatus of FIG. 6 and FIG. 7.

FIG. 11 is FIG. 6 and a contour explanatory drawing of ingredient fluid manufacture part 10 shown in a nanoparticle auto manufacturing apparatus of FIG. 7. The ingredient liquid manufacturing portion 10 is provided with the mixer 18a mixing the solvent 11 and ingredient material 12, the cross valve 18b emitting the liquid mixture aa to the ingredient liquid retention tank 14 or the bead mill 19, and the motor driving the bead mill 19. In the case that there are easily dispersed or dissolved by the mixer 18a the substances such as the ingredient material 12 or the direct ingredient material contained in the ingredient material 12, the reducing agent and the organic matter being the organic coating, the ingredient liquid passes in the direction of arrow cc by the cross valve 18a, and it is supplied to and saved in the ingredient fluid retention tank 14. By way of example only, in silver nitrate as the direct ingredient material, it dissolves easily in the water which is the solvent 11.

In the case that the ingredient material 12 coheres in the shape of a comparatively big particle, after it was mixed with the solvent 11 by the mixer 18a, the cross valve 18b is thrown open to stream to the bead mill 19 side and the liquid mixture mixed with the mixer 18aa is supplied to the bead mill 19. The bead mill 19 comprises the dispersion portion 13a, the centrifugal separation portion 13b and the chilled water tube arrangement 13c, so that the dispersion portion 13a and the centrifugal separation portion 13b are rotated in the direction of arrow rr or in the reverse direction by the driving of said motor M. When the liquid mixture aa is supplied to the bead mill 19 and the dispersion portion rotates, the bead particles collides, so that the cohering ingredient material 12 is powdered, it is dispersed in the solvent 11 and the preferable dispersion liquid is generated. The cohering ingredient material 12 is powdered to the size of several tens micron to about submicron. This dispersion liquid includes the bead particles, and streams in the direction of arrow bb and is supplied to the centrifugal separation portion. Here, the bead particles are collected with the centrifugal separation, and they are fed back to the dispersion portion 13b as shown with the arrow dd. While the bead mill 19 operates, the cooling water is supplied from the cooling apparatus 15 to the chilled water tube arrangement 13c so as that the reaction between the solvent 11 and the ingredient material 12 does not proceed, so that it is continued to be cooled the dispersion liquid of the dispersion portion 13b and the ingredient liquid from which the bead particles are removed. The ingredient liquid is streamed in a direction of arrow cc from the centrifugal separation portion 13b, so that it is supplied to the ingredient liquid retention tank 14 and is saved by the specified quantity. As described earlier, the ingredient liquid saved in the ingredient liquid retention tank 14 is heated and controlled to the preheating temperature lower than reaction start temperature by means of the preheating apparatus 16. Furthermore, when reaction preparation of said nanoparticle manufacturing portion completes, the electromagnetic valve 17 becomes to be the open condition, and the ingredient liquid is supplied to the nanoparticle manufacturing portion by means of the pump.

Figure 12:
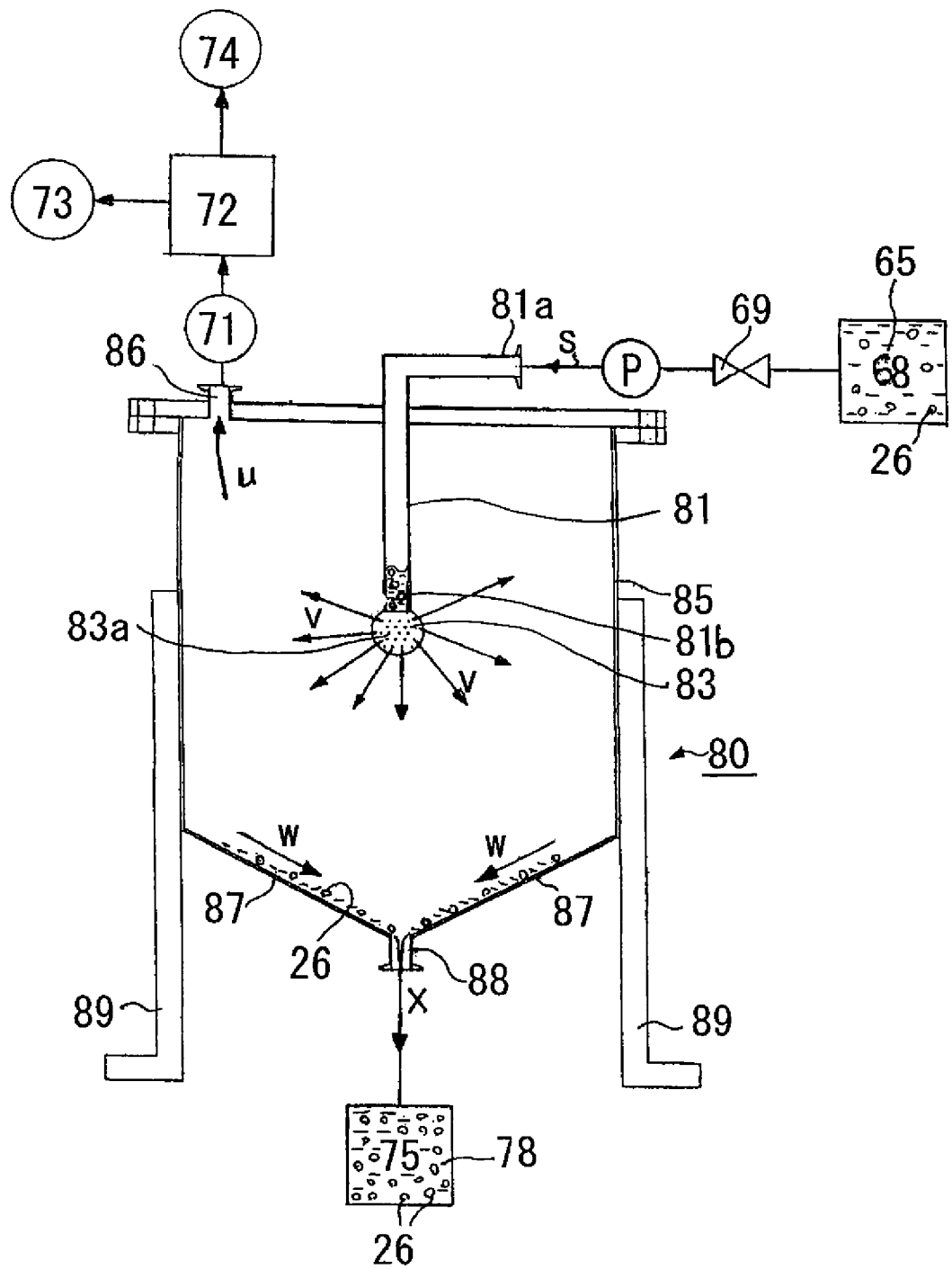
FIG. 12 is an outlined explanatory diagram of the generation liquid enrichment portion shown in the nanoparticle automatic production apparatus of FIG. 6 and FIG. 7.

FIG. 12 is an outlined explanatory diagram of the generation liquid enrichment portion shown in the nanoparticle automatic production apparatus of FIG. 6 and FIG. 7. The generation liquid enriching portion 80 comprises the blast tube 81, the decompression large container 85 and the support member 89 supporting this decompression large container 85, where the spraying device 83 having the spraying holes 83a is installed at the outlet end 81b of the blast tube 81. To the blast tube 81, the generation liquid 65 including nanoparticles 26 is supplied from the inlet end 81a, which is connected to the generation liquid retention tank 68 through the pump P and the electromagnetic valve 69. Therefore, when the electromagnetic valve 69 becomes to be the open condition and the pump P is driven, the generation liquid 65 is pressurized and supplied in a direction of arrow s. The large container tapering portion 87 is installed in the bottom portion of said decompression large container 85, and the exhaust outlet 88 is installed in this large container tapering portion 87. If this exhaust outlet 88 is closed with the electromagnetic valve etc., except the exhaust gas outlet 86 installed at the upper portion of the decompression large container 85, a seal condition can be held for the decompression large container 85. Between said blast tube 81 and the decompression large container 85, it is possible to stream through the outlet end 81b and the spraying holes 83a of the spraying device 83, but the stream between said blast tube 81 and the decompression large container 85 is intercepted by the electromagnetic valve etc. which is not illustrated. Therefore, at the time of close condition between the outlet end 81b of blast tube 81 and the exhaust outlet 88 of decompression large container 85, when exhausted from the exhaust gas outlet 86 by the exhaust apparatus 71 such as the vacuum blower, the interior of the large container 85 becomes the vacuum condition.

Furthermore, at the time of close condition between the outlet end 81b of blast tube 81 and the exhaust outlet 88 of large container 85, the generation liquid 65 is not supplied to the interior of the blast tube 81 by the pump P. When the vacuum degree of the interior of the decompression large container 85 arrives at equal to or less than the specified value, the outlet end 81b becomes the open condition and the pump P operates. Therefore, the generation liquid 65 from the blast tube 81 is sprayed to the interior of decompression large container 81 in vacuum by the spraying holes 83a of the spraying device 83. Then, in the interior of decompression large container 81, the solvent volatilizes and is exhausted to the liquefier 72 by means of the exhaust apparatus 71. With this liquefier 72, the solvent which volatilized by heat exchanger is liquefied, and the solvent is collected with the solvent recovery 73. Furthermore, the generation gas of which the solvent was removed by liquefaction is ejected to the atmospheric air with the safe gas atmospheric air discharge 74. Therefore, the generation liquid 65 is enriched, then is gathered in a direction of arrow w by means of the large container tapering portion 87, and the enrichment liquid 78 is saved. When the enrichment liquid 78 becomes the specified quantity, the outlet end 81b of the blast tube 81 becomes the close condition, so that the exhaust apparatus 71 stops, and the enrichment liquid 78 streams from the exhaust outlet 88 of the decompression large container 85 in a direction of arrow X, and then it is saved in the enrichment liquid retention tank 75. In this enrichment liquid 78, the nanoparticles exist with high density in comparison with the generation liquid.

Figure 13:
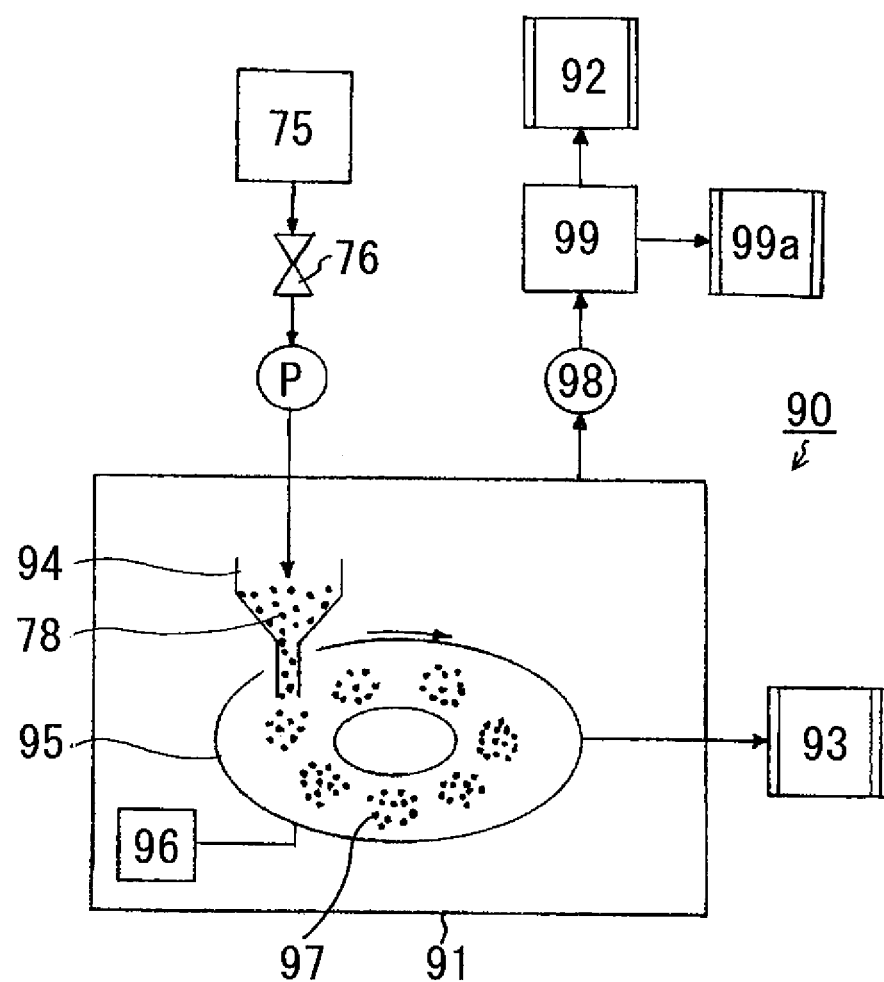
FIG. 13 is an outlined explanatory diagram of the enrichment liquid dry portion shown in the nanoparticle automatic production apparatus of FIG. 6 and FIG. 7.

FIG. 13 is an outlined explanatory diagram of the enrichment liquid dry portion 90 shown in the nanoparticle automatic production apparatus of FIG. 6 and FIG. 7.

As described before, the enrichment liquid dry portion 90 is configured from the enrichment liquid dry portion 91, the solvent recovery 92 and the nanoparticle recovery 93, and further, the vacuum exhaust apparatus 98, the liquefier 99 and the insurance gas atmospheric air discharge 99a are installed between the enrichment liquid dry portion 91 and the solvent recovery 92. By the pump P said enrichment liquid 78 is supplied from the enrichment liquid retention tank 75 to the hopper 94 of the enrichment liquid dry apparatus 91 through the electromagnetic valve 76. The enrichment liquid dry apparatus 91 is installed with the rotating table 95 and the temperature control apparatus 96 heating this rotating table 95. The enrichment liquid 78 dripping with a specified quantity on the rotating table 95 from the hopper 94 is dried on the rotating table 95 heated, and the dry nanoparticle 97 is formed. This dry nanoparticle 97 is collected with the nanoparticle recovery 93 automatically by absorption and so on.

In addition, the solvent evaporating by the drying is exhausted by means of the vacuum exhaust apparatus 98 and is cooled and liquefied by the liquefier 99, so that the solvent is collected by the solvent recovery 92, and the generated gas whose solvent was removed is ejected to the atmospheric air by the insurance gas atmospheric air discharge 99*a*.

FIG. 14 is a basic control flow diagram of the computer control apparatus. With the basic flow diagram described after, the same code is referred to the same thing as an apparatus and a member shown in above apparatus description and the block diagram. In each flow of FIG. 14 to FIG. 19, "N" and "Y" mean "No" and "Yes", respectively. When the basic control flow starts, in the step S1, it is judged whether the initial settings such as the reaction temperature, the reacting amount and the running time are set already, so that in the case of N, it is come back to the preceding stage of the step S1. In the step S1, in the case of Y, it proceeds to the step 2 and it is judged whether the ingredient liquid is manufactured. In the case that the ingredient liquid exists at a specified quantity already, it becomes No, and it proceeds to the step S3. When the ingredient liquid does not exist or reach to a specified quantity, the step S2 becomes Y, then it proceeds to the subroutine SUB1 and it shifts to the ingredient liquid manufacturing process. When the ingredient liquid is manufactured to a specified quantity, it proceeds to the step S3. In the step S3, it is judged whether the nanoparticles are manufactured, and in the same manner, in the case that the generation liquid exists at a specified quantity already, it becomes N and it proceeds to the step S4. In the case that the step S3 is Y, it proceeds to the subroutine SUB2.

With the subroutine SUB2, it shifts to the nanoparticle synthesis process, and the generation liquid including the nanoparticles is generated by a specified quantity and it proceeds to the step S4. In the step S4, it is judged whether the generation liquid is enriched, and in the case that the enrichment liquid exists at a specified quantity already, it becomes N and it proceeds to the step 5. In the case that the step S4 is Y, it proceed to the subroutine SUB3, so that it proceeds to the generation liquid enrichment process and the enrichment liquid is manufactured at a specified quantity and it proceeds to the step 5. In the step S5, it is judged whether the enrichment liquid is dried, and in the case that the dry nanoparticles are manufactured at a specified quantity already, it becomes N and it proceeds to the step 6. When the dry nanoparticles are not manufactured to a specified quantity, the step S5 becomes Y, and it proceeds to the subroutine SUB4, so that it shifts to the enrichment liquid dry process, the enrichment liquid is dried, and after the drying, it proceeds to the step 6.

In the step S6, it is judged whether the manufacturing of nanoparticles is finished. When the nanoparticles are not manufactured to a specified quantity, it becomes N and it returns to the step S2. When the nanoparticles were manufactured to a specified quantity, it becomes Y and the flow finishes by END.

Figure 14:
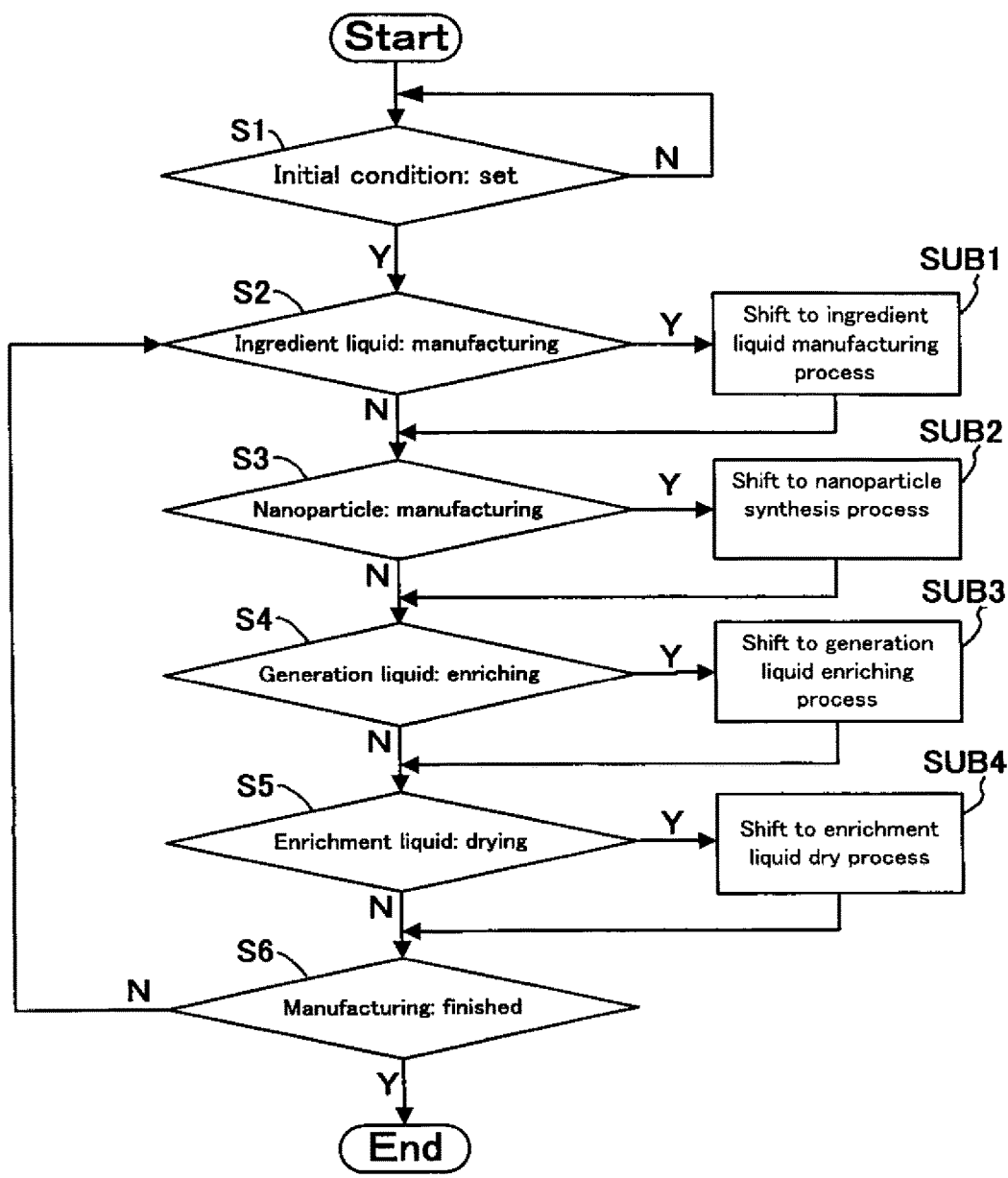
FIG. 14 is a basic control flow diagram of the computer control apparatus.
Figure 15:
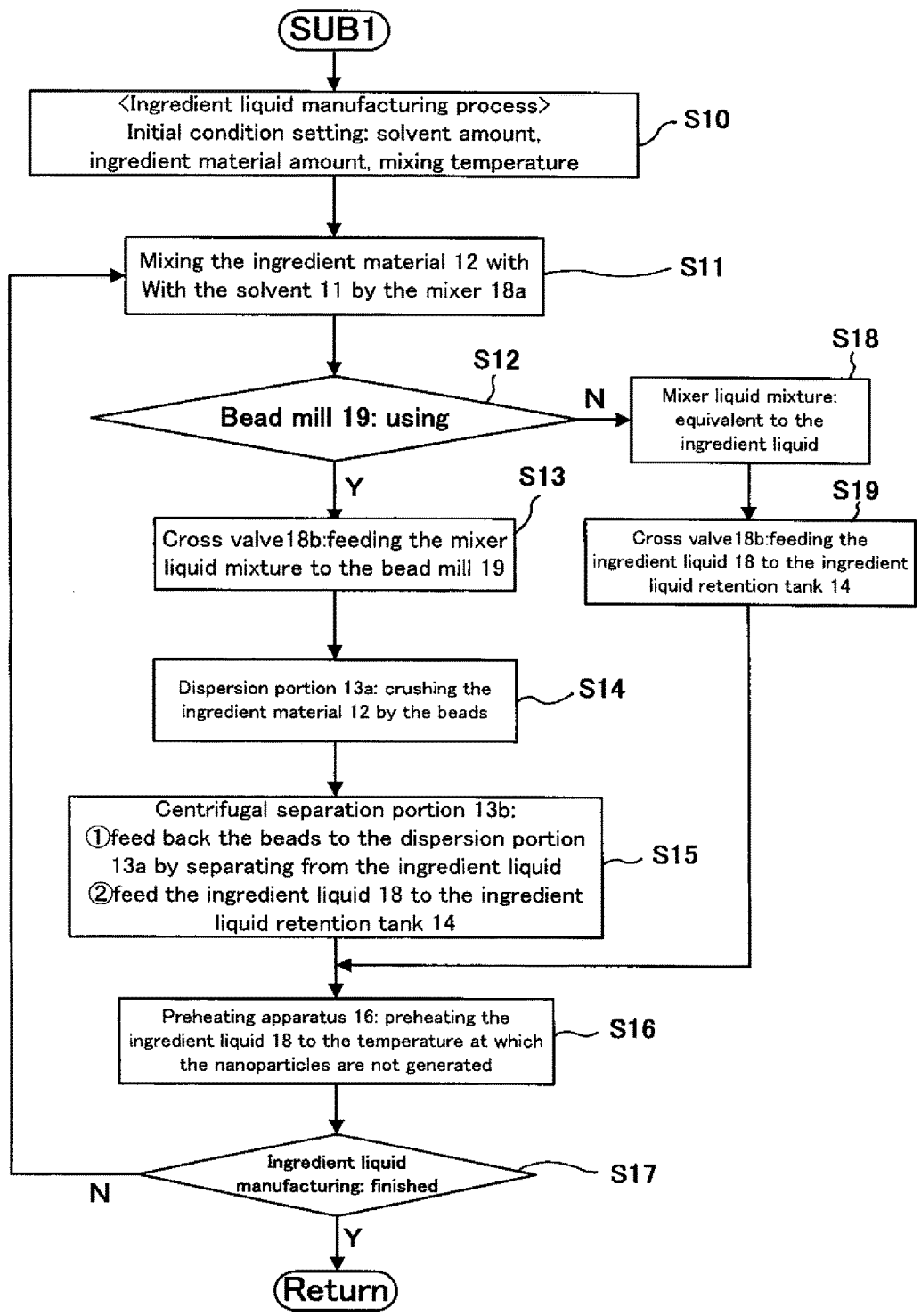
FIG. 15 is an ingredient liquid manufacturing subroutine flow diagram showing the ingredient liquid manufacturing process of the computer control apparatus.

FIG. 15 is an ingredient liquid manufacturing subroutine flow diagram showing the ingredient liquid manufacturing process of the computer control apparatus. FIG. 15 is the flow diagram of subroutine SUB1 shown in FIG. 14. When the subroutine SUB1 starts, in the step S10, it is done the initial condition setting such as an amount, an ingredient material mass and a mixing temperature. Although it is possible to change the initial conditions for each driving, when the same nanoparticles are manufactured, the initial condition setting is done automatically according to the values input beforehand and it proceeds to the step S11. In the step S11, it is ordered that the ingredient material 12 is mixed with solvent 11 in the mixer 18a. When the mixing of the step S11 is finished, it proceeds to the step S12. In the step S12, it is judged whether the bead mill 19 is used. In the case that the ingredient material 12 has the insolubility against the solvent 11 or that it is difficult to disperse the ingredient material 12 to the solvent 11 appropriately, the bead mill is employed, and the step S12 becomes Y then it proceeds to the step 13. In the case that the ingredient material 12 is easily dispersed or dissolved in the solvent 11, it becomes N and it proceeds to the step 18. In the step S18, the liquid mixture (mixer liquid mixture) mixed with the mixer is assumed the ingredient liquid 18, and it proceeds to the step S19. In the step S19, the ingredient liquid comprising of the mixer liquid mixture is emitted to the ingredient liquid retention tank 14 through the cross valve 18b, and it proceeds to the step S16. In the step S13, said mixer liquid mixture is sent out to the bead mill through the cross valve and it proceed to the step S14. In the step S14, the ingredient material 12 is crushed and micronized by the bead particles at the dispersion portion 13a and it proceeds to the step S15. In the step S15, by the centrifugal separation portion, the bead particles are separated from the ingredient liquid 18 and they are fed back to the dispersion portion 13a, so that the ingredient liquid 18 is emitted to the ingredient liquid retention tank 14, and it proceeds to the step S16. In the step S16, the ingredient liquid 18 is preheated to the temperature at which the nanoparticles are not generated with the preheating apparatus 16, and it proceeds to the step S17. In the step S17, it is judged whether the ingredient liquid manufacturing is finished, when the ingredient liquid was saved at a specified quantity, it becomes Y and then it becomes RETURN. In the case of N, it returns to the step S11, so that the ingredient material 12 is mixed with the solvent 11, and the steps so far are repeated.

Figure 16:
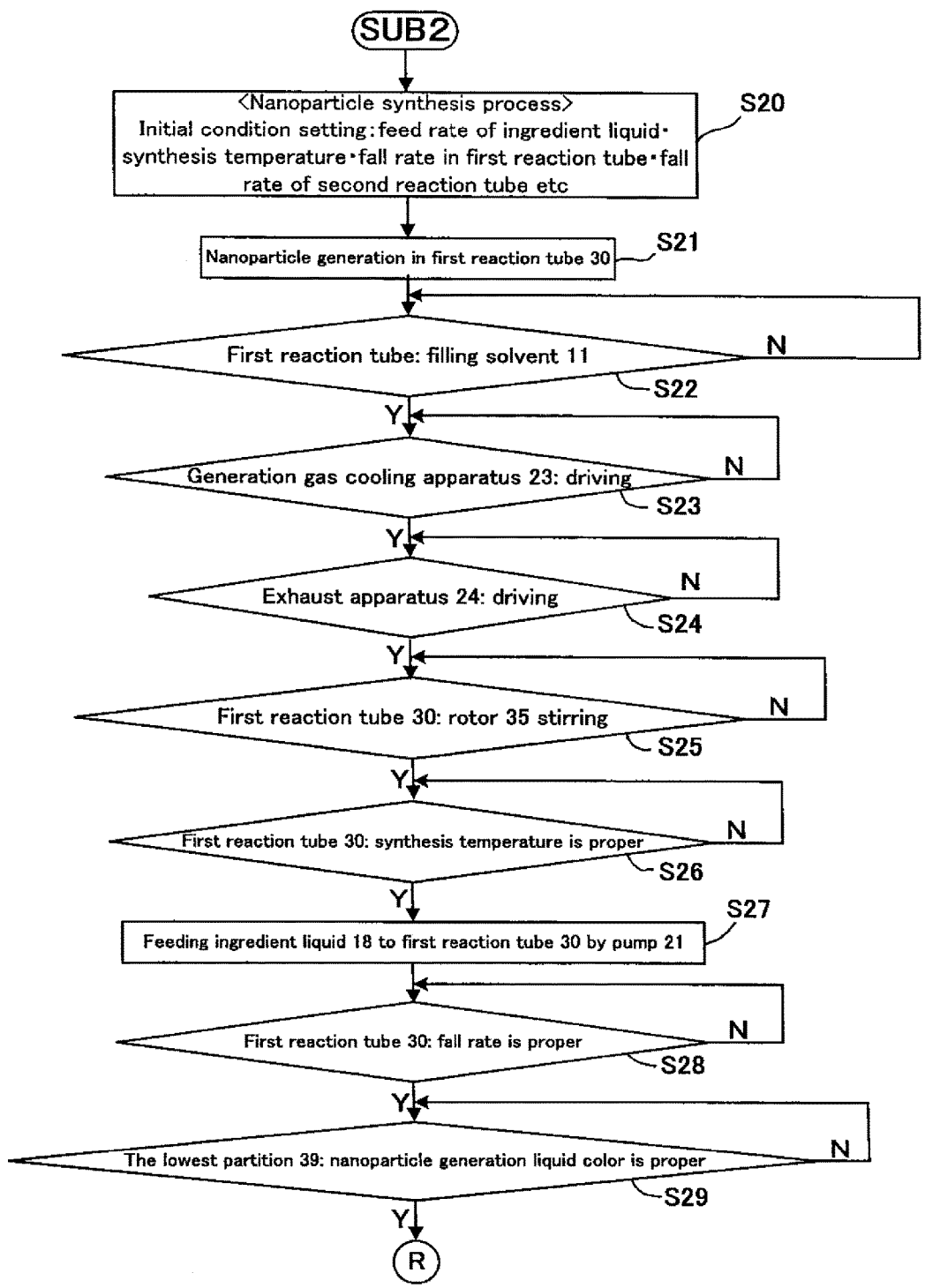
FIG. 16 is a nanoparticle synthesis subroutine flow diagram showing the nanoparticle synthesis process in the first reaction tube of the computer control apparatus.

FIG. 16 is a nanoparticle synthesis subroutine flow diagram showing the nanoparticle synthesis process in the first reaction tube of the computer control apparatus. FIG. 16 is a flow diagram of the subroutine SUB2 shown in FIG. 14. In the step S20, it is done the initial condition setting of the nanoparticle synthesis process. The set initial conditions are the things such as the ingredient liquid feed rate, the synthesis temperature, the falling speed in the first reaction tube, the lifting speed in the second reaction tube and so on. When the initial condition setting is finished, it proceeds to the step S21, so that the nanoparticle generation in the first reaction tube 30 is done and it proceeds to the step S22. In the step S22, it is judged whether the solvent 11 is already filled in the first reaction tube 30, when the solvent 11 is not filled yet, it becomes N and it returns to the step S22. When the solvent 11 is already filled, the step S22 becomes Y and it proceeds to the step S23, so that it is judged whether the generation gas cooling apparatus 23 is during operation. When, in the step S23, the generation gas cooling apparatus 23 is operating, it becomes Y and proceeds to the step S24, and when the generation gas cooling apparatus 23 is not in operation, it becomes N and returns to the step S23, so that the step S23 is repeated till the generation gas cooling apparatus 23 is operating. In the step S24, it is judged whether the exhaust apparatus 24 is operating, and for the case Y, it proceeds to the step S25.

Figure 17:
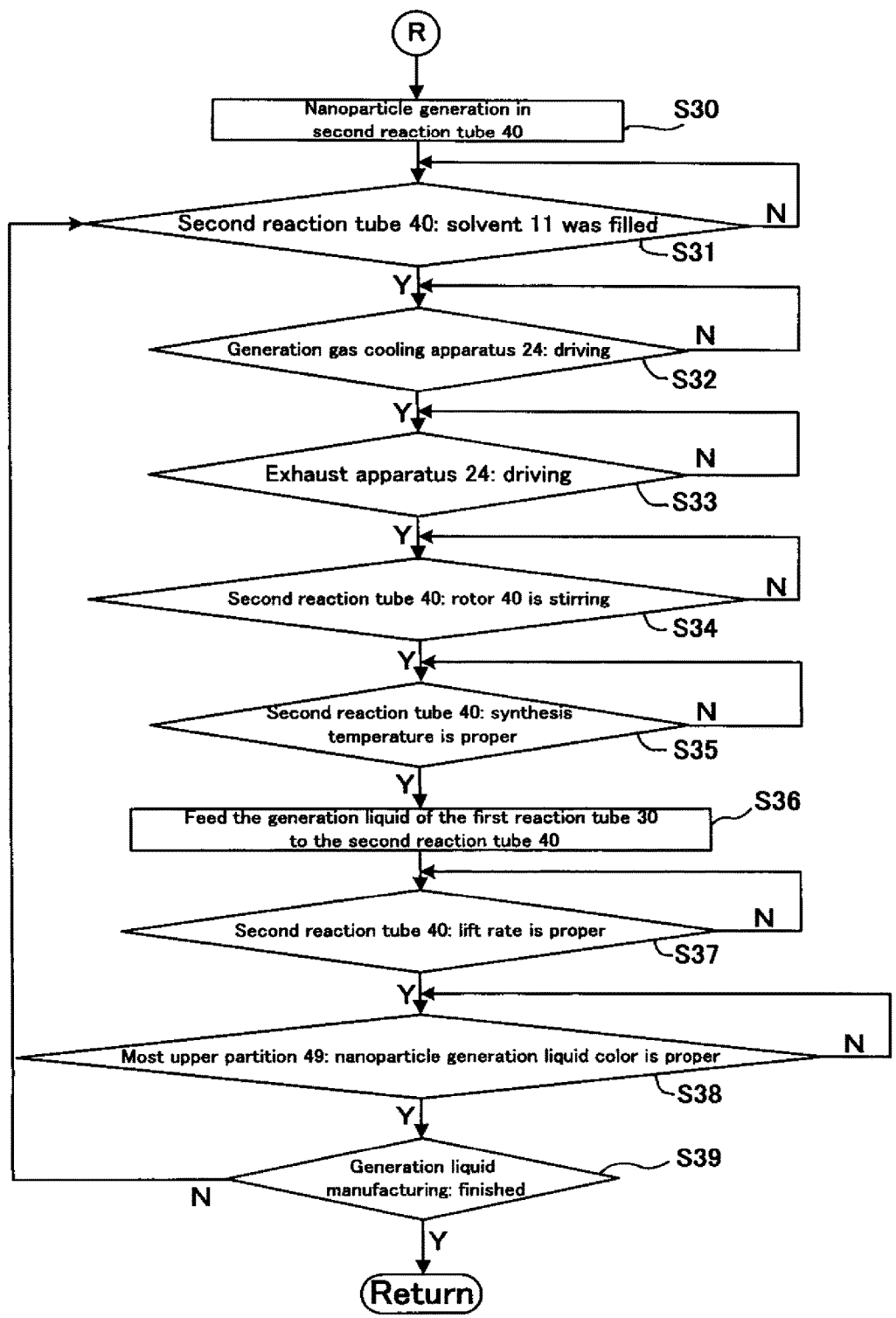
FIG. 17 is a nanoparticle synthesis subroutine flow diagram showing the nanoparticle synthesis process in the second reaction tube of the computer control apparatus.

IN the case of N, it returns to the step S24, and the step S24 is repeated till the exhaust apparatus 24 is operating. In the step S25, it is judged whether the rotor 35 of the first reaction tube 30 is stirring, and for the case Y, it proceeds to the step S26. When not stirring, it becomes N and comes back to the step S25, and till the rotor is stirring with a predetermined rotation speed, the step S25 is repeated. In the step S26, it is judged whether the first reaction tube 30 is proper in the synthesis temperature, and for the case Y, it proceeds to the step S27. When the first reaction tube 30 is not heated to the proper synthesis temperature, it becomes N and comes back to the step S26, and till it reaches to the proper synthesis temperature, the step S26 is repeated. In the step S27, the ingredient liquid 18 is supplied to the first reaction tube 30 with the pump 21, and it proceeds to the step S28. In this step S28, it is judged whether the falling rate of the ingredient liquid 18 is proper in the first reaction tube 30, and for the case Y, it proceeds to the step S29. When the falling rate is not proper, it becomes N and comes back to the step 28, and the rotation speed of the rotor 35 and the flow rate of the ingredient liquid 18 are adjusted, so that till the falling rate becomes proper, the step S28 is repeated. In the step S29, it is judged whether the color of the nanoparticle generation liquid is proper in the lowest partition 39, and for the case Y, it proceeds to the step S30 shown in next FIG. 17. FIG. 16 and FIG. 17 are the subroutines proceeding unitedly. The nanoparticle generation liquid color is observed by sampling one part of the first generation fluid flowing out from the first reaction tube 30, or by flowing the minute amount of the first generation fluid into a transparent pipe for identification of the nanoparticle generation liquid color. When the nanoparticle generation liquid color is not proper, it means that the unreacting quantity is much, and it comes back to the step S29 and this step is repeated. At this time, drain of the first generation liquid is intercepted with the electromagnetic valve etc. installed in the effluent passage, and the feed of the ingredient liquid 18 may be halted.

FIG. 17 is a flow connected unitedly by FIG. 16 and "R", and a nanoparticle synthesis subroutine flow diagram showing the nanoparticle synthesis process in the second reaction tube of the computer control apparatus. In the step S30, the nanoparticle generation with the second reaction tube 40 is started, and it proceeds to the step S31. In the step S31, it is judged whether the solvent 11 is filled in the second reaction tube 40 already, and for the case Y, it proceeds to the step S32. In the case of N, it returns to the step 31, and till the second reaction tube 40 is filled with the solvent 11, the step S31 is repeated. In the step S32, it is judged whether the generation gas cooling apparatus 23 is operating, and for the case Y, it proceeds to the step S33. In the case of N, it returns to the step 32, and in the same manner with the first reaction tube 30, till the generation gas cooling apparatus 23 operates, the step S32 is repeated. In the step S33, it is judged whether the exhaust apparatus 24 is operating, and for the case Y, it proceeds to the step S34. In the case of N, it returns to the step 33, and till the exhaust apparatus 24 operates, the step S33 is repeated. In the same manner, in the step S34, it is judged whether the rotor 45 of the second reaction tube 40 is stirring, and for the case Y, it proceeds to the step S35. In the case of N, it returns to the step 34, and till it is stirred with a predetermined rotation speed by the rotor 45, the step S34 is repeated. In the step S35, it is judged whether the liquid temperature of the second reaction tube 40 is proper as the synthesis temperature, and for the case Y, it proceeds to the step 36. In the same manner, when the liquid temperature of the second reaction tube 40 is not heated to the proper synthesis temperature, it becomes N and returns to the step S35, and till it reaches to the proper synthesis temperature, the step S35 is repeated. In the step S36, the first generation liquid of the first reaction tube 30 is supplied to the second reaction tube 40, and it proceeds to the step S37. In this step S37, it is judged whether the lift rate of the first generation liquid in the second reaction tube 40 is proper, and for the case Y, it proceeds to the step S38. For the case N, it returns to the step S37, the flow rate of the first generation liquid etc. with the rotation speed of the rotor 35 are adjusted with the pressure of the second reaction tube 40 and the first reaction tube 30 and the feed quantity of the generation liquid etc., and till the lift rate becomes proper, the step 37 is repeated. In the step S38, it is judged whether the color of the nanoparticle generation liquid is proper in the most upper partition 49, and for the case Y, it proceeds to the step S39. In the same manner with the first reaction tube 30, the nanoparticle generation liquid color is observed by sampling one part of the generation liquid flowing out, or by flowing the minute amount of the first generation fluid into a transparent pipe for identification of the nanoparticle generation liquid color. When the nanoparticle generation liquid color is not proper, it means that the reacting quantity does not reach the specified quantity occurring the complete reaction, and it returns to the step S38 and this step is repeated. At this time, drain of the generation liquid is intercepted with the electromagnetic valve etc. installed in the effluent passage, and the feed of the first ingredient liquid 18 from the first reaction tube 30 may be halted. In the step S39, it is judged whether the manufacturing of the generation liquid is finished, and for the case Y, it becomes "Return" and the subroutine SUB2 is finished. When the quantity of manufacturing of the generation liquid does not reach the specified quantity, it becomes N and returns to the step S31.

Figure 18:
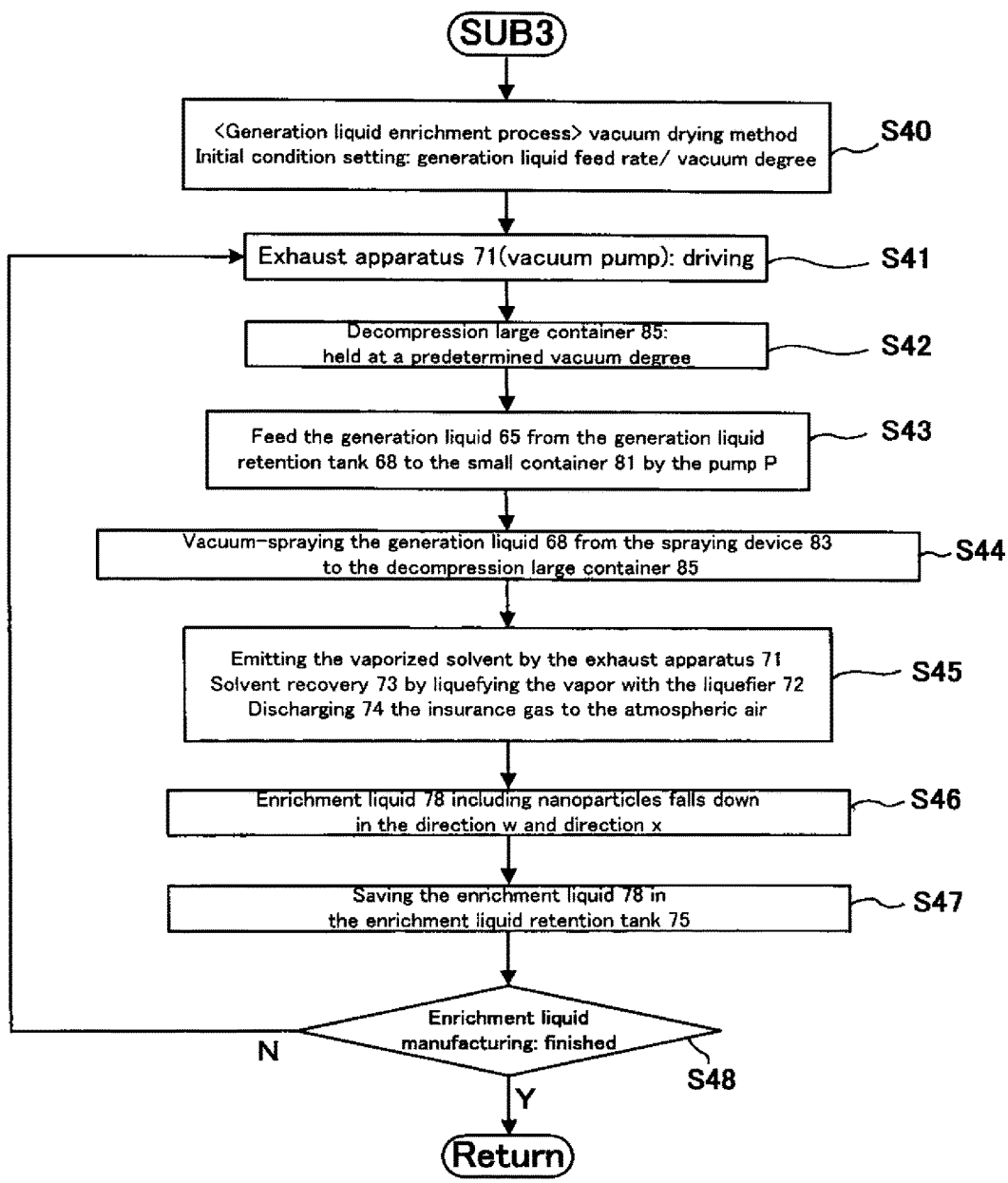
FIG. 18 is a generation liquid enrichment subroutine flow diagram showing the generation liquid enrichment process of the computer control apparatus.

FIG. 18 is a generation liquid enrichment subroutine flow diagram showing the generation liquid enrichment process of the computer control apparatus. In the subroutine SUB3, with the step S40, it is done the initial condition setting of the generation liquid enrichment process by vacuum drying method etc., and as the initial conditions, there are the generation liquid feed rate and the vacuum degree. When the initial condition setting is finished, it proceeds to the step S41, so that the exhaust apparatus 71 (vacuum pump) is driven and it proceeds to the step S42. In the step S42, the decompression large container 85 is held at the predetermined vacuum degree, and in next step S43, the generation liquid 65 is supplied from the generation liquid retention tank 68 to the small container 81 by the pump P, and it proceeds to the step S44. In the step S44, the generation liquid 68 is vacuum-sprayed from the spraying device 83 to the decompression large container 85, and in the step S45, the solvent vaporizes and is exhausted with the exhaust apparatus 71, so that the solvent included in the exhaust (gas) is liquefied with the liquefier 72, and it is collected with the solvent recovery 73, then the insurance gas from which the solvent 11 was removed is emitted through the atmospheric air discharge 74, and it proceeds to the step S47. In the step S47, the enrichment liquid 78 is saved in the enrichment liquid retention tank 75, and in next step S48, it is judged whether the enrichment liquid manufacturing is finished. For the case Y in the step S48, it becomes "Return" and the subroutine SUB3 is finished. When the enrichment liquid manufacturing does not reach the specified quantity, it becomes N and returns to the step S41.

Figure 19:
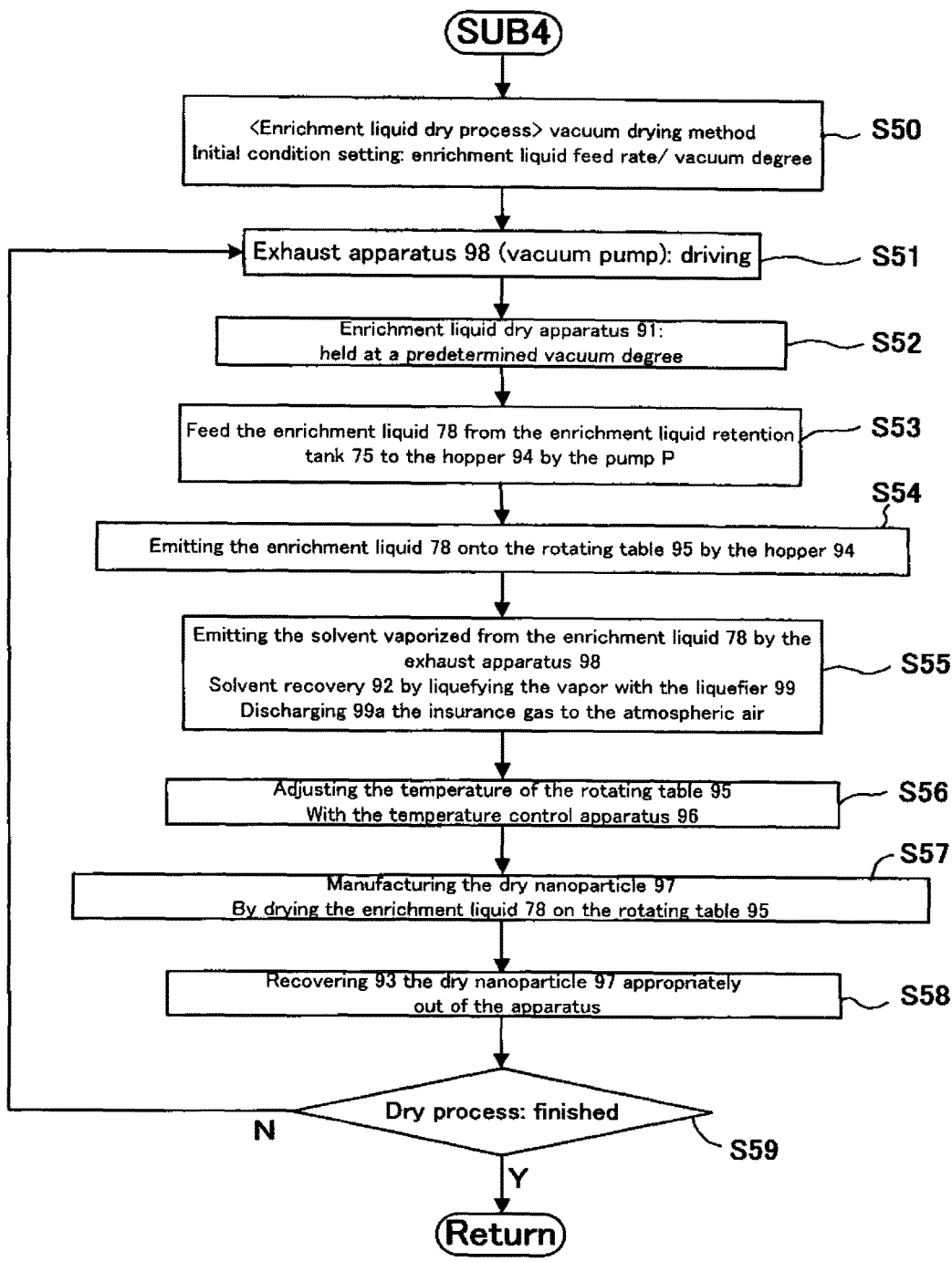
FIG. 19 is an enrichment liquid dry subroutine flow diagram showing the enrichment liquid dry process of the computer control apparatus.
Figure 20:
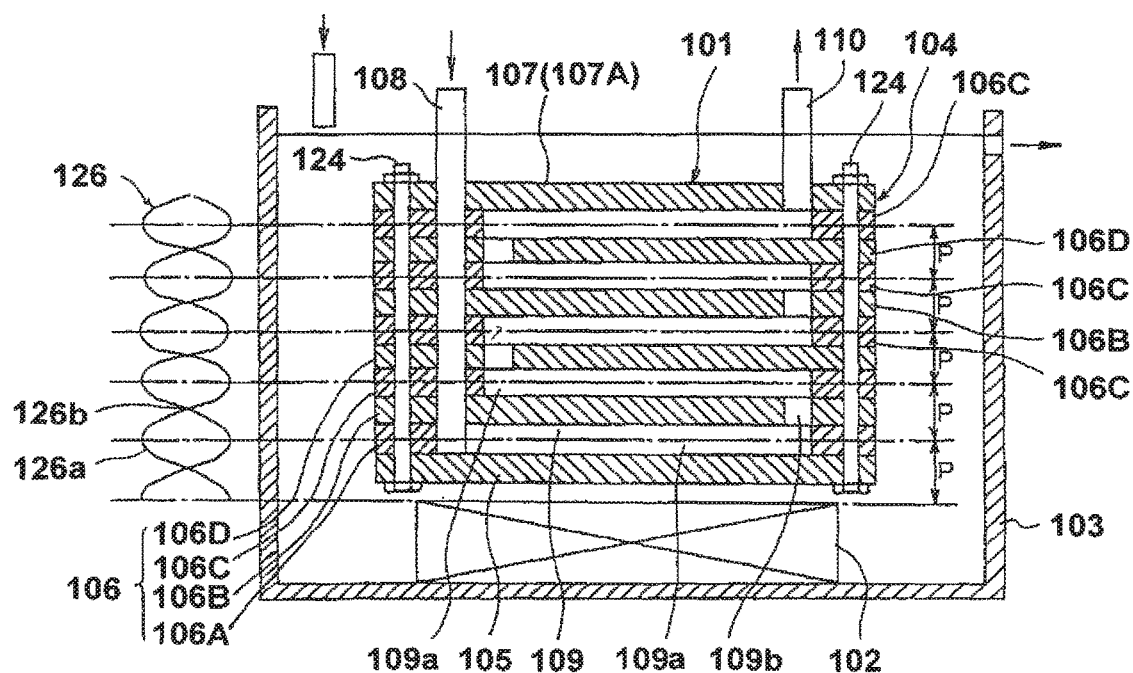
FIG. 20 is an outlined explanatory diagram of patent document 1 showing the conventional apparatus.

FIG. 19 is an enrichment liquid dry subroutine flow diagram showing the enrichment liquid dry process of the computer control apparatus. In the subroutine SUB4, with the step S50, it is done the initial condition setting of the enrichment liquid dry process by vacuum drying method, and as the initial conditions, there are the enrichment liquid feed rate and the vacuum degree. In next step S51, the vacuum exhaust apparatus 98 (vacuum pump) is driven and it proceeds to the step S52. In the step S52, the enrichment liquid dry apparatus 91 is held at the predetermined vacuum degree, and in next step S53, the enrichment liquid 78 is supplied from the enrichment liquid retention tank 75 to the hopper 94 by the pump P, and it proceeds to the step S54. In the step S54, the enrichment liquid 78 is emitted from the hopper onto the rotating table 95, in the step S55, the solvent vaporizes from the enrichment liquid 78 and is exhausted with the exhaust apparatus 98, and the gas is liquefied with the liquefier 99, so that the solvent 11 is collected by the solvent recovery 92 and the insurance gas is ejected by the atmospheric air discharge 99a, namely ejected to the atmospheric air. In next step S56, the thermoregulation of the rotating table 95 is done with the temperature control apparatus 96, and in its next step S57, the enrichment liquid 78 is dried on the rotating table 95 and it becomes the dry nanoparticle 97. In next step S58, the dry nanoparticles 97 are collected (93) out of the apparatus, and it proceeds to the step S59. In the step S59, it is judged whether the dry process is finished, and for the case Y, it becomes "Return", the subroutine SUB4 is finished and for the case N, it returns to the step S51.

[Silver Carbonate/n-Hexanol: C6AgAL-MP Nanoparticle Generation Experiment 1-5]

In this generation experiment 1-5, n-hexanol (C number of 6) is used. In the denotation of C6AgAL-MP C6 means that C number is 6, Ag means that it is a silver core and AL means alcohol. For example, MP is the designator for the thing that it is used the mass production continuity manufacturing system comprising of the nanoparticle production apparatus shown in FIG. 1 and FIG. 2, and it is distinguished from the denotation of C6AgAL based on the conventional pot method. Alcohol whose C number is 6 is n-hexanol.

At first, silver carbonate of 2 kg (Ag2CO3) is mixed with n-hexanol of 12.7 L (showing the liter) and the thin dispersion liquid with mixture ratio of n-hexanol of 14 mol to silver carbonate of 1 mol is prepared. As described later, the liter is expressed by L and the milliliter is expressed by mL. This thin dispersion liquid was supplied to the bead mill 19 shown in FIG. 11, and silver carbonate was crushed to the minute fine particles by the bead. This bead mill treatment is repeated by 20 times, so that silver carbonate is crushed in uniform minute fine particles, the ingredient liquid 18 is manufactured, and it was accommodated in the ingredient liquid retention tank 14.

Next, when there is used the nanoparticle production apparatus having the first reaction tube 30 and the second reaction tube 40 as indicated in FIG. 1, the electromagnetic valve 17 is opened, the n-hexanol of total 15 L is filled in the first reaction tube 30 and the second reaction tube 40 with the rate of 0.4 L per minute, so that after the electromagnetic valve 17 is closed, furthermore the n-hexanol of 1.5 L was additionally filled in the first reaction tube 30. The experiment with the use of the nanoparticle production apparatus shown in FIG. 1 is done with denotation of the generation experiment 3-5. In the preliminary experiment to use only the first reaction tube 30 shown in FIG. 2, while closing the electromagnetic valve, the n-hexanol of 8.5 L is filled. The experiments using only the first reaction tube 30 is assumed as the generation experiments 1-2. In the generation experiments 1-2, by the heating apparatus 22, the setting temperature was adjusted at 110 degrees Celsius. In the generation experiments 3-4, the n-hexanol in the first reaction tube 30 is adjusted at 100 degrees Celsius and the n-hexanol in the second reaction tube 40 is adjusted at 90 degrees Celsius. In the generation experiment 1, the n-hexanol in the first reaction tube 30 and the second reaction tube 40 was set at 90 degrees Celsius together. With the pump 21, the ingredient liquid 18 of the ingredient liquid retention tank 14 was continuously supplied to the first reaction tube 30 with the flow rate of 400 mL/min (generation experiments 1-3), 450 mL/min (generation experiment 4) and 500 mL/m (generation experiment 5). In the first reaction tube 30, the rotor 35 is turned with 150 rpm by the rotation apparatus 50, and in the second reaction tube it is turned with 100 rpm, the annular spiral flow was occurred in the interior of the first and second reaction tubes 30, 40. In the inside of the annular spiral flow, the silver carbonate is reduced by the n-hexanol, and it is generated the silver nanoparticle (C6AgAL) having the organic coating originated from the n-hexanol hexanol around the silver core. When the nanoparticles are generated, the liquid changes to a little black and the black color liquid arrives at the lower portion of the first reaction tube 30 in about 10 minutes. The clock time arriving at the exit of the second reaction tube 40 is more than about 15 minutes. From the result of thermal analysis of the sampling liquid, the appearing clock time of liquid in which the reaction was completed with 100% is given as the reaction time of Table 1 described below. From the first or the second reaction tube, the liquid is discharged continually with the flow rate of the same amount as the feed amount, and since the liquid in the each reaction tube is stirred, the reaction is controlled so as to advance under the constant temperature distribution always. Because it is not black for first 10 minutes, it is the n-hexanol itself and this is emitted to another container. The black liquid is generated after passing for 20 minutes, and this black liquid in which the reaction is finished is the generation liquid 65 in which the nanoparticles are generated, and it is saved in the generation liquid retention tank 68. Carbon dioxide gas occurs, so that the inside of the first reaction tube 30 is adjusted to become constant at 0.3 atmospheric-pressure with gage pressure by the backpressure valve. The second reaction tube 40 uses the pressure-variable backpressure valve, and it is set to be slightly high at 0.32 atmospheric-pressure with gage pressure.

Black generation liquid 65 is sampled for the purpose of knowing the characteristics of the generated nanoparticle, and 0.001 kg is taken out for the thermal analysis, 10 minutes later the same amount is taken out, furthermore 10 minutes later the same amount is taken out, and moreover 10 minutes later the same amount is taken out. Generation liquid 65 is pulled out from the generation liquid retention tank 68 every 10 minutes, and the n-hexanol is removed by the centrifugal separation and the filtration under the decompression pressure, and only nanoparticles were extracted. At that time, for the nanoparticles extracted in each stage, the yield was measured every stage, then the thermal analysis was done, and then the yield and the property of the nanoparticle are investigated, at last they are shown in Table 1 and Table 2, as discussed below. When the feed liquid disappears, the n-hexanol is supplied replacing with it and the reaction finish liquid continues being pulled out for 10 minutes, so that after that, it is shifted to another container because of becoming thin, then the residual liquid in the container is washed by feeding the n-hexanol till the transparent liquid appears, and the reaction is finished.

TABLE 1

C6AgAL-MP The characteristic table of nanoparticle in generation experiment 5

| Sampling Number | Reaction Liquid Taking Out Time (min) | Reaction Time (min) | Nanoparticle Yield(kg) | DTA Peak Temperature (° C.) | Silverized Temperature (° C.) | Coating Amount (mass %) | Estimated Average Particle Diameter (nm) |
|---|---|---|---|---|---|---|---|
| #1 | 15 | 15 | 0.001 | 150 | 222 | 8.98 | |
| #2 | 25 | 25 | 0.001 | 185 | 227 | 7.25 | |
| #3 | 30 | 30 | 0.54 | 190 | 230 | 9.60 | |
| #4 | 40 | 30 | 0.68 | 190 | 230 | 9.32 | |
| #5 | 55 | 30 | 0.68 | 190 | 230 | 8.84 | |
| Total | | | 1.9 | | | 9.23 (Average) | 11 (Average) |

In Table 1, the detailed analysis results of the reaction result in the generation experiment are shown every elapsed time at which the reaction liquid is taken out. In the reaction liquid sampling #1 and #2, the particle diameter becomes smaller for the early generation nanoparticle, and by reflecting it, the DTA peak temperature and the silverized temperature become a little low and the coated amount is high. As for the characteristics of thermal analysis of the sampling liquid and the nanoparticle collected through extraction or, the direct comparison is difficult because the extraction condition is different. The nanoparticle yield collected through extraction is grand total 1.9 kg, and the characteristics of nanoparticle is approximately the same, too. The coated amount is the average of 9.2%, and from this, the estimated average particle diameter was obtained as 11 nm. In the generation experiment 5 with the use of this reaction system, the maximum nanoparticle generation amount per unit clock time is obtained to be 3.5 kg/h that the total yield is divided by 0.55 clock time needed from the reaction liquid fetch to the reaction closing. In addition, the summary of the reaction result of C6AgAL-MP in the generation experiment 1-5 is shown in Table 2. From these results, when the reaction setting temperature is high and the flow rate is small, the average coating amount is low, so the nanoparticle diameter becomes large. What the temperature of the reaction liquid is higher by 10 degrees Celsius than the setting temperature is due to occurring of the reaction generation heat.

generation experiment 6, the setting temperature was set to be 85 degrees Celsius for both of the first reaction tube 30 and the second reaction tube 40. When the electromagnetic valve 17 is opened, with the pump 21, the ingredient liquid 18 of the ingredient liquid retention tank 14 was supplied to the first reaction tube 30 for continuity with the flow rate of 500 mL/min. In the first reaction tube 30, the rotor 35 is turned with 150 rpm by the rotation apparatus 50, and in the second reaction tube it is turned with 100 rpm, the annular spiral flow was occurred in the interior of each reaction tube. In the inside of the annular spiral flow, the silver carbonate is reduced by the n-butanol, and it is generated the silver

TABLE 2

C6AgAL-MP Each reaction characteristic comparison table in generation experiment 1-S

| Generation Experiment No. | Bead mil I Condition Diameter (Circulation) | Mole Fraction of Ag2CO3 | First Reaction Tube (° C.)※ (Second Reaction Tube (° C.)) | Reaction Temp. (° C.) | Reaction Time (min) | Flow Rate (mL/min) | Maximum Coating Amount (mass %) | Average Coating Amount (mass %) | Estimated Particle Diameter (nm) | Yield (kg) (%) | Maximum Yield/Hour (kg/h) |
|---|---|---|---|---|---|---|---|---|---|---|---|
| 1 | 0.2 mm (15 cycle) | 1/15 | 110 | 120 | 30 | 400 | 6.8 | 3.6 | 38 | 1.57 | 2.1 |
| 2 | 0.2 mm (15 cycle) | 1/15 | 110 | 120 | 30 | 400 | 6.7 | 4.2 | 29 | 1.59 (90) | 2.1 |
| 3 | 0.3 mm (30 cycle) | 1/15 | 100 (90) | 110 | 30 | 400 | 6.0 | 6 | 19 | 1.6 | 2.2 |
| 4 | 0.2 mm (15 cycle) | 1/15 | 100 (90) | 110 | 30 | 450 | 8.4 | 7.2 | 17 | 1.7 | 2.4 |
| 5 | 0.2 mm (15 cycle) | 1/15 | 90 (90) | 100 | 30 | 500 | 9.6 | 9.2 | 11 | 1.9 | 3.5 |

※No description corresponds to the experiment using only the first reaction tube.

[Silver Carbonate/Butanol: C4AgAL-MP Nanoparticle Generation Experiment 6]

The first reaction tube 30 shown in FIG. 1 and the nanoparticle manufacturing apparatus which put the second reaction tube 40 together were used, and manufacture of a butanol origin organic coating silver nanoparticle (C4AgAL-MP is referred to as) was tested. In the denotation of C4AgAL-MP C4 means that C number is 4, Ag means that it is a silver core and AL means alcohol. Alcohol whose C number is 4 is butanol. MP is the designator for the thing that it is used the nanoparticle production apparatus shown in FIG. 1, and it is distinguished from the denotation of C4AgAL based on the conventional pot method. At first, silver carbonate of 2 kg is mixed with normal butanol (shown later as n-butanol) of 9.4 L and the thin dispersion liquid with mixture ratio of n-butanol of 14 mol to silver carbonate of 1 mol is prepared.

This thin dispersion liquid was supplied to the bead mill 19 shown in FIG. 11, and silver carbonate was crushed to the minute fine particles by the bead. This bead mill treatment is repeated by 15 times, so that silver carbonate is micronized to average particle diameter of about 100 nm, and the ingredient liquid 18 dispersed uniformly is manufactured, and it was accommodated in the ingredient liquid retention tank 14.

Next, the electromagnetic valve 17 is opened, the n-butanol of total 15 L is filled in the first reaction tube 30 and the second reaction tube 40 with the rate of 0.5 L per minute, so that after the electromagnetic valve 17 is closed, the n-butanol of 1.5 L was additionally filled in the first reaction tube. Moreover, by the heating apparatus 22, in the present nanoparticle (C4AgAL) having the organic coating originated from the n-butanol around the silver core.

When the nanoparticle is generated, the liquid varies in blackish brown. The blackish brown liquid arrives at the lower portion of the first reaction tube 30 in about 10 minutes. The clock times arriving at the exit of the second reaction tube are more than about 15 minutes. From the result of thermal analysis of the sampling liquid, the appearing clock time of liquid in which the reaction was completed with 100% is given as the reaction time of Table 1 described below. From the reaction tube, the liquid is discharged continually with the flow rate of the same amount as the feed amount, and since the liquid in the reaction tube is stirred, the reaction is controlled so as to advance under the constant temperature distribution always. Because it is not blackish brown for first 10 minutes, it is the n-butanol itself and this is emitted to another container with the switching operation of the valve. The blackish brown liquid is generated after passing for 20 minutes, and this blackish brown liquid in which the reaction is finished is the generation liquid 65 in which the nanoparticles are generated, and it is saved in the generation liquid retention tank 68. Carbon dioxide gas occurs, so that the inside of the first reaction tube 30 is adjusted to become constant at 0.3 atmospheric-pressure with gage pressure by the backpressure valve.

The second reaction tube 40 uses the pressure-variable backpressure valve, and it is set to be slightly high at 0.32 atmospheric-pressure with gage pressure.

TABLE 3

C4AgAL-MP The characteristic table of nanoparticle in generation experiment 6

| Sampling Number | Reaction Liquid Taking Out Time (min) | Reaction Time (min) | Nanoparticle Yield(kg) | DTA Peak Temperature (° C.) | Silverized Temperature (° C.) | Coating Amount (mass %) | Estimated Average Particle Diameter (nm) |
|---|---|---|---|---|---|---|---|
| #1 | 20 | 20 | 0.001 | 165 | 208 | 9.69 | |
| #2 | 30 | 20 | 0.70 | 170 | 210 | 10.41 | |
| #3 | 45 | 20 | 0.80 | 175 | 220 | 9.34 | |
| #4 | 52 | 20 | 0.40 | 175 | 217 | 11.54 | |
| Total | | | 1.90 | | | 10.2 (Average) | 6(Average) |

Sampling #1-4 of a sample shown in Table 3 are explained. The reaction liquid is sampled for the purpose of knowing the characteristics of the generated nanoparticle and it is analyzed by the thermal analysis method. Generation liquid 65 is pulled out from the generation liquid retention tank 68 every 10 minutes, and the centrifugal separation and the filtration under the decompression pressure are done, so that the n-butanol is removed, and only nanoparticles were extracted. At that time, for the nanoparticles extracted in each stage, the yield was measured every stage, then the thermal analysis was done, and then the yield and the property of the nanoparticle are investigated, at last they are shown in Table 3.

When the feed liquid disappears, the n-butanol is supplied replacing with it and the reaction finish liquid continues being pulled out for 10 minutes, so that after that, it is shifted to another container because of becoming thin, then the residual liquid in the container is washed by feeding the n-butanol till the transparent liquid appears, and the reaction is finished. And the nanoparticles are analyzed every the reaction time, and there are measured the average particle diameter of the silver core and the weight % of the coated organic substance amount.

In the generation experiment 6 with the use of this reaction system, the maximum nanoparticle generation amount per unit clock time is obtained to be 5.4 kg/h that the total yield is divided by 0.35 clock time needed from the reaction liquid fetch to the reaction closing. If the results of the generation experiment 6 are summarized, the results shown in Table 4 is provided.

When these results are compared with the results of C6AgAL-MP which is the reaction with the n-hexanol in the generation experiment 5, although the boiling point of n-butanol is lower than the n-hexanol, its reducing power is stronger and the coating amount is larger at the lower temperature, so that the nanoparticle whose particle diameter is small is generated. In addition, the DTA peak temperature and the silverized temperature are low, and as the small particle diameter distribution becomes important in the junction application, it is found that the result of n-butanol reaction is more superior than the result of the n-hexanol reaction in all faces of the application expansion of nanoparticle.

INDUSTRIAL APPLICABILITY

Therefore, it is one object of the present invention to provide a nanoparticle production method and a nanoparticle production apparatus, by which it is possible not only to manufacture the uniform nanoparticles with minute diameter and simultaneously to mass-produce the nanoparticles for continuity, but also to shorten or prolong the generation time of nanoparticles, and it is the other object of the present invention to provide an automatic production apparatus which can treat consistently the manufacture of ingredient liquid, the generation of nanoparticles, the enrichment of generation liquid and the drying of enriched liquid by computer control. If the present invention method and apparatus are used, it is possible to manufacture a large quantity of nanoparticles whose particle size is uniform in the liquid phase reaction, and because it is possible to manufacture the nanoparticles in the spiral flow, besides the annular spiral flow, the generation rate of nanoparticles is fast and it enables the mass production of nanoparticles having the uniform particle size. Since the present invention method and apparatus can manufacture any kind of nanoparticle in the liquid phase method, it is possible to manufacture nanoparticles such as metal nanoparticle, inorganic nanoparticle and organic nanoparticle efficiently. Therefore, the present invention method and apparatus can contribute to various kinds of industrial field such as the junction field, the printing field, the cosmetic field, and the chemical industrial field.

TABLE 4

C4AgAL-MP The reaction characteristic comparison table in generation experiment 6

| Generation Experiment No. | Bead mil I Condition Diameter (Circulation) | Mole Fraction of Ag2CO3 | First Reaction Tube (° C.)✕ (Second reaction Tube (° C.)) | Reaction Temp. (° C.) | Reaction Time (min) | Flow Rate (mL/min) | Maximum Coating Amount (mass %) | Average Coating Amount (mass %) | Estimated Particle Diameter (nm) | Yield (kg) | Maximum Yield/Hour (kg/h) |
|---|---|---|---|---|---|---|---|---|---|---|---|
| 6 | 0.2 mm (15 cycle) | 1/15 | 85(85) | 95 | 20 | 500 | 11.5 | 10.2 | 6 | 1.90 | 5.4 |

DENOTATION OF REFERENCE NUMERALS

1 Nanoparticle automatic production apparatus
2 Computer control apparatus
3 ROM
4 CPU
5 RAM 6 Input unit (INPUT)
7 Output unit (OUTPUT)
8 I/O port
10 Ingredient liquid manufacturing portion
11 Solvent
12 Ingredient material
13 Ingredient liquid manufacturing apparatus
13a Dispersion portion
13b Centrifugal separation portion
13c Chilled water tube arrangement
14 Ingredient liquid retention tank
15 Cooling apparatus
16 Preheating apparatus
17 Electromagnetic valve
18 Ingredient liquid
18a Mixer
18b Cross valve
19 Bead mill
20 Nanoparticle manufacturing portion
21 Pump
22 Temperature control device (Heating apparatus)
23 Generation gas cooling apparatus
23a Input tube
23b Spiral tube
23c Output tube
24 Exhaust apparatus
24a Exhaust tube
25 First generation liquid
26 Nanoparticle
30 First reaction tube
30a Reaction tube head
30b Annular receiving portion
30c Drain valve
30d Protrusion tube portion
30e Inflow end
30f Outflow end
30g Reaction tube body portion
30h Outer wall
31 Separator
32 Top plate portion
32a Gas omission hole
32b Outer circumferential edge
32d Annular opening portion
33 Annular portion
34 Locking bolt
35 Rotor
36 Blade
37 Annular portion
38 Locking bolt
39 Partition
40 Second reaction tube
40a Reaction tube head
40b Annular receiving portion
40c Drain valve
40d Protrusion tube portion
40e Inflow end
40f Outflow end
40g Reaction tube body portion
40h Outer wall
41 Separator
42 Top plate portion
42a Gas omission hole
42b Outer circumferential edge
42d Annular opening portion
43 Annular portion
44 Locking bolt
45 Rotor
46 Blade
47 Annular portion
48 Locking bolt
49 Partition
50 Rotation apparatus
51 Rotation joint portion
52 Rotating shaft
53 Bearing
60 Liquefier
64 Level indicator
65 Generation liquid
66 Insurance gas atmospheric air discharge
67 Solvent recovery
68 Generation liquid retention tank
69 Electromagnetic valve
70 Generation liquid enriching portion
71 Exhaust apparatus (vacuum pump)
72 Liquefier
73 Solvent recovery
74 Insurance gas atmospheric air discharge
75 Enrichment liquid retention tank
76 Electromagnetic valve
78 Enrichment liquid
80 Generation liquid enriching apparatus
81 Blast tube
81a Inlet end
81b Outlet end
83 Spraying device
83a Spraying hole
85 Decompression large container
86 Exhaust gas outlet
87 Large container tapering portion
88 Exhaust outlet
89 Support member
90 Enrichment liquid dry portion
91 Enrichment liquid dry apparatus
92 Solvent recovery
93 Nanoparticle recovery
94 Hopper
95 Rotating table
96 Temperature control apparatus
97 Dry nanoparticle
98 Vacuum exhaust apparatus
99 Liquefier
99a Insurance gas atmospheric air discharge
a Liquid mixture
e Spiral flow (fall spiral flow)
f Fall flow (fall annular spiral flow)
g Generation gas
j Spiral flow (lift spiral flow)
k Lift flow (lift annular spiral flow)
m Generation gas
M Motor
P Pump
Q1 Terminal
Q2 Terminal
Q3 Terminal
Q4 Terminal
101 Micro reactor
102 Ultrasonic generation apparatus
103 Water bath
104 Reactor
105 Base plate
106 Middle lamination thin plate
107 Top plate
108 Inflow line
109 Microchannel 109a Microchannel
109b Microchannel
110 Outflow outlet
124 Engaging bolt
126 Supersonic wave
126a Part which is strengthened by supersonic wave interference
126b Part which is weakened by supersonic wave interference
201 Reactor
202 Reaction tube
203a Zirconium salt aqueous solution (ingredient aqueous solution)
203b Suspension liquid
204 Precipitation particle
205 Reaction mixture (precipitation solution)
206 Hydrous zirconia sol
207 Heating medium
207a Inlet
207b Outlet
208 Velocity gradient which is formed in reaction tube interior
212 pH value moderator
213 Mixer
310 Precursor feed portion
320 First heating portion
321 First circulatory device
330 Second heating portion
331 Second circulatory device
340 Cooling portion
350 Transfer apparatus

The invention claimed is:

1. An nanoparticle production apparatus comprising; a reaction tube configured to be filled with a solvent and configured to be filled with an ingredient liquid for production of a nanoparticle, the ingredient liquid comprising a mixture of an ingredient material and said solvent; a temperature control unit controlling a temperature of said ingredient liquid in said reaction tube at a synthesis temperature of said nanoparticle; an inflow end of said reaction tube supplying said ingredient liquid; a rotor configured to generate a spiral flow along an inner surface of said reaction tube while said ingredient liquid supplied is mixed with said solvent of said reaction tube or while said ingredient liquid is stirred; and an outflow end of said reaction tube emitting a generation liquid including nanoparticles while forming said nanoparticles from said ingredient liquid in said spiral flow, wherein a rotating shaft is disposed at a central position of said reaction tube, separators fixed to the rotating shaft are disposed at an interval between each other, a partition is formed between adjacent separators or between one of said separators and a tube end of said reaction tube, said rotor is fixed to said rotating shaft in said partition, and an annular opening portion is formed between an outer circumferential edge of said separator and said inner surface of said reaction tube, where an annular spiral flow streams through said partition because said spiral flow passes through said annular opening portion, so that said nanoparticle is formed in said annular spiral flow, and in a top plate portion of said separator, one or more gas-emission holes are opened, so that a generation gas occurring in said partition passes upward through said one or more gas-emission holes.

2. The nanoparticle production apparatus according to claim 1, wherein, before said ingredient liquid is supplied to said reaction tube, there is disposed a preheating apparatus that preheats said ingredient liquid in a range of temperature at which said nanoparticle is not synthesized.

3. The nanoparticle production apparatus according to claim 1, comprising a plurality of said reaction tube configured in a series form and/or a parallel form, and said spiral flow in an inner portion of each reaction tube is selected from a fall flow, a slope flow or a lift flow.

4. The nanoparticle production apparatus according to claim 1, further comprising one or more apparatus selected from a manufacturing apparatus of said ingredient liquid, a manufacturing apparatus of an enrichment liquid in which a concentration of said nanoparticle is increased by enriching of said generation liquid after manufacturing said generation liquid and a drying apparatus of said enrichment liquid by which dries said enrichment liquid.

5. A nanoparticle production apparatus according to claim 1, further comprising a computer control apparatus.

6. The nanoparticle production apparatus according to claim 4, wherein the manufacturing apparatus of said enrichment liquid comprises a spraying device.

7. The nanoparticle production apparatus according to claim 4, wherein the drying apparatus of said enrichment liquid comprises a vacuum drying apparatus.

* * * * *